United States Patent
Burr et al.

[11] Patent Number: 5,978,652
[45] Date of Patent: Nov. 2, 1999

[54] COMMON DIRECT BROADCASTING SERVICE SYSTEM

[75] Inventors: Douglas Burr, San Jose, Calif.; Troy Ellington, Vienna, Va.

[73] Assignee: Space Systems/Loral, Inc., Palo Alto, Calif.

[21] Appl. No.: 08/781,395

[22] Filed: Jan. 10, 1997

[51] Int. Cl.[6] .................................................. H04B 7/185
[52] U.S. Cl. .............................. 455/12.1; 342/363; 348/8
[58] Field of Search .................................. 455/12.1, 13.1, 455/13.3, 20, 3.2, 6.3, 6.2; 342/363, 365; 348/8

[56] References Cited

U.S. PATENT DOCUMENTS

| | | | |
|---|---|---|---|
| 4,109,202 | 8/1978 | Kudsia et al. | 325/3 |
| 4,308,541 | 12/1981 | Seidel et al. | 342/363 |
| 5,204,686 | 4/1993 | Petrelis et al. | 342/374 |
| 5,760,819 | 6/1998 | Sklar et al. | 342/363 |
| 5,787,335 | 7/1998 | Novak | 348/8 |

FOREIGN PATENT DOCUMENTS 0 687 627 A1  12/1995  European Pat. Off. .

*Primary Examiner*—Nguyen Vo
*Assistant Examiner*—Marsha D. Banks-Harold
*Attorney, Agent, or Firm*—Perman & Green, LLP

[57] ABSTRACT

The invention relates to a Common Direct Broadcasting Service (CDBS) system for a communications spacecraft. The CDBS system comprises N uplink antennas for receiving uplinks from terrestrial transmitting stations. Each uplink includes left-hand circular polarized (LHCP) signals and/or right-hand circular polarized (RHCP) signals. The LHCP signals and the RHCP signals have frequencies within predetermined channels of a first and/or second predefined frequency band. The CDBS system also comprises means for separating the LHCP signals of the uplinks received by each uplink antenna from the RHCP signals of the uplinks received by each uplink antenna. The CDBS system further comprises a plurality of receivers for converting the separated LHCP signals and RHCP signals of the uplinks to first signals and second signals, respectively, of the uplinks. The first and second signals have frequencies within channels of a third and/or fourth predefined frequency band. The CDBS system also includes means for selecting a predetermined number of the first and second signals of the uplinks, and means for down-selecting signals of the predetermined number of the first and second signals having frequencies within selected ones of the channels of the third and/or fourth predefined frequency bands. The CDBS system further comprises a plurality of downlink antennas for down-linking signals down-selected by the down-selecting means from the communications spacecraft to selected ones of the plurality of terrestrial receiving stations.

22 Claims, 11 Drawing Sheets

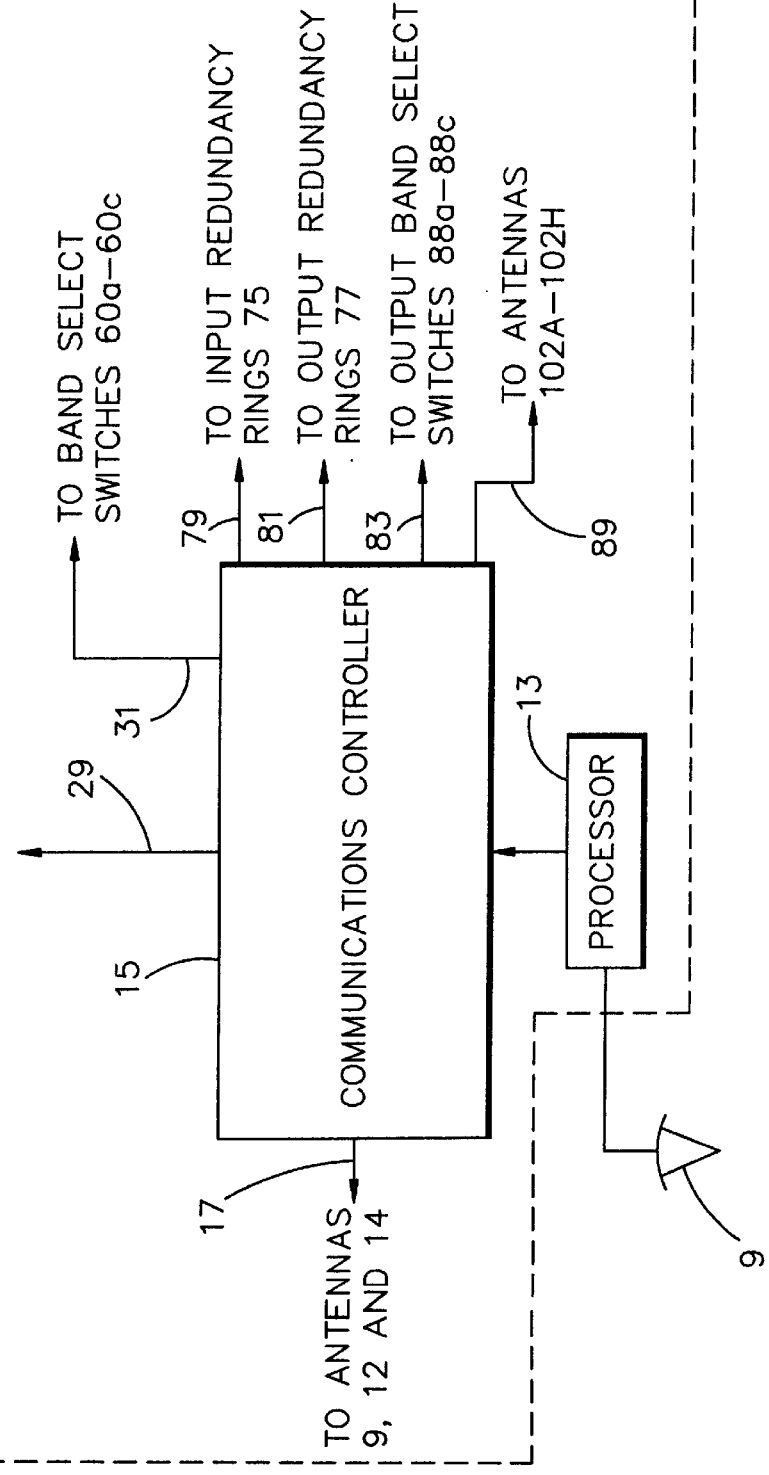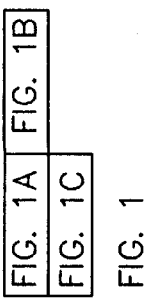

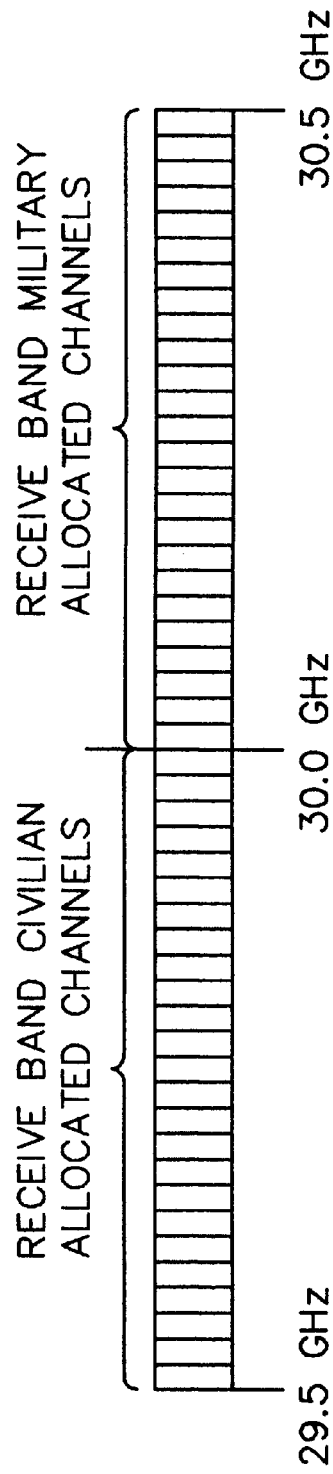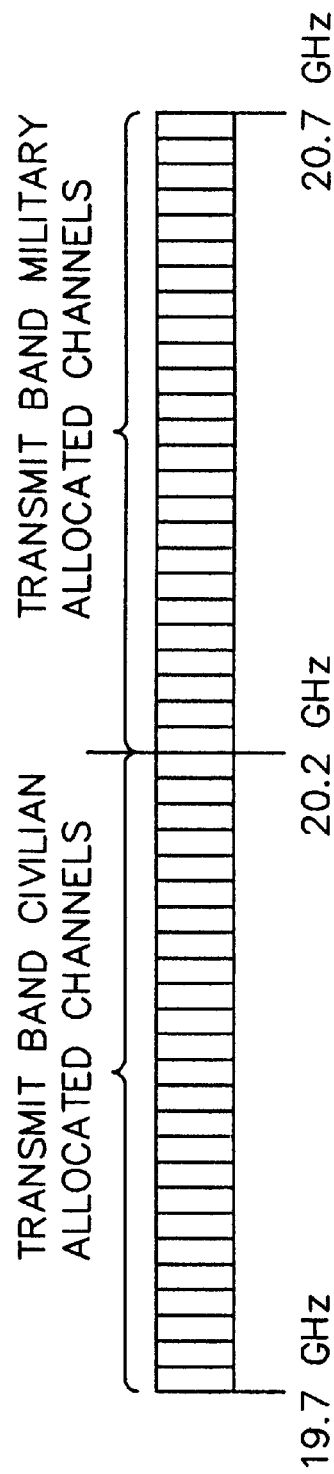

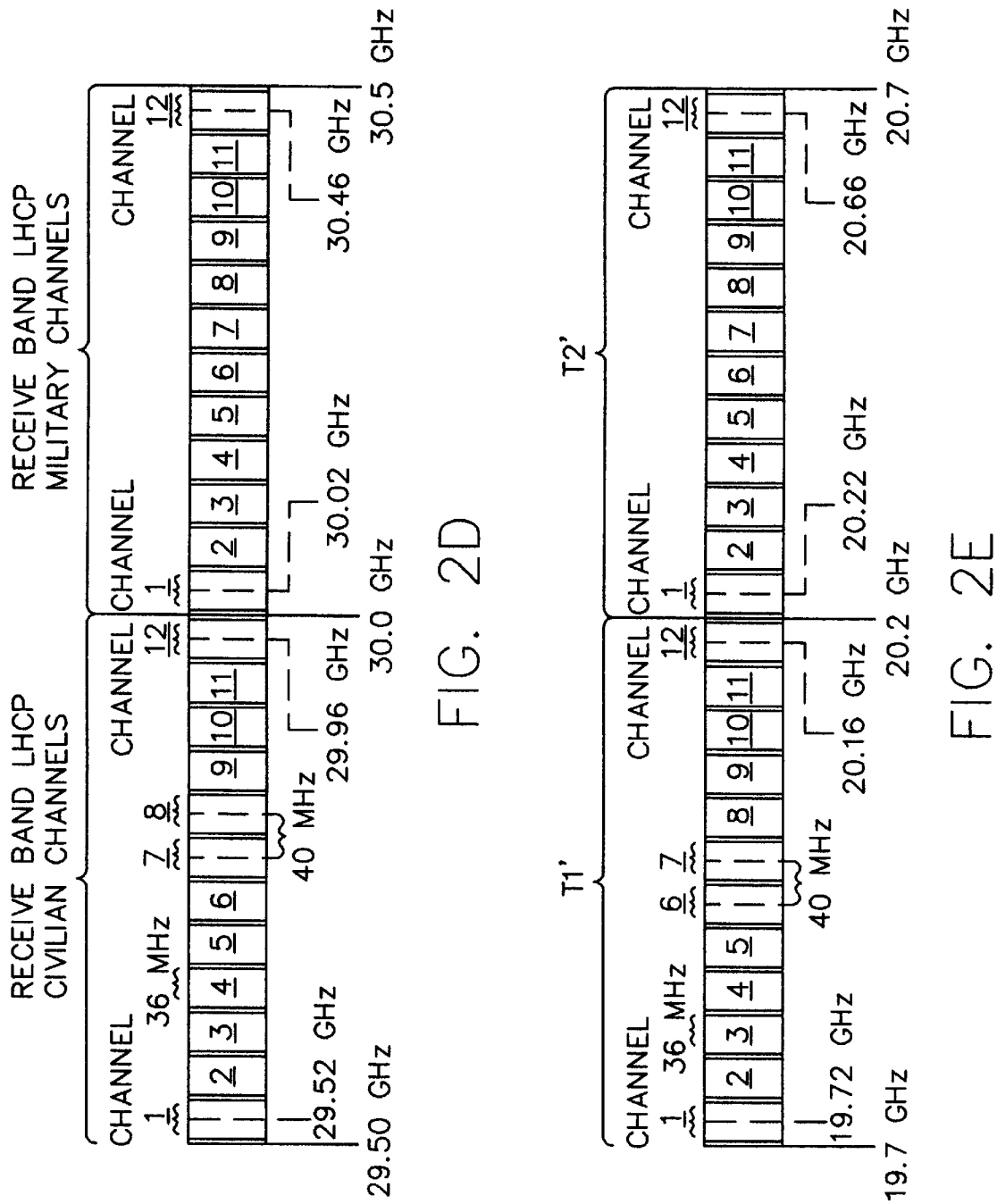

COMMON DIRECT BROADCASTING SERVICE SYSTEM

FIELD OF THE INVENTION

This invention relates to satellite-based broadcast communications systems and, in particular, this invention relates to a Common Direct Broadcasting Service System.

BACKGROUND OF THE INVENTION

Conventional communications satellites include hardware for effecting communications between terrestrial transmitting and receiving stations belonging to a only single user community, such as, for example, the commercial (e.g., civilian) user community or the military (e.g., government) user community. As a result, in certain applications where it is required to effect communications between civilian users and between military users that are located within a same general coverage area, more than one communications satellites are required to service the respective user communities. As can be appreciated, the use of more than one satellite for servicing these user communities can be expensive and inefficient. Therefore, it would be desirable to provide a spacecraft communication system that can effect communications between civilian users and between military users simultaneously. This spacecraft communication system would enable a communication spacecraft to service a larger customer base than has been serviced by conventional communication satellites, and would thus permit spacecraft communications hardware to be utilized in a more efficient manner than conventional spacecraft communications hardware.

OBJECTS OF THE INVENTION

It is an object of this invention to provide a spacecraft communication system that can be used to effect communications between civilian users and between military users simultaneously.

Further objects and advantages of this invention will become apparent from a consideration of the drawings and ensuing description.

SUMMARY OF THE INVENTION

The foregoing and other problems are overcome by a Common Direct Broadcasting Service (CDBS) system for a spacecraft. The CDBS system preferably comprises at least two steerable "uplink" antennas for receiving signals that are uplinked to the spacecraft from terrestrial stations located within coverage areas of the antennas.

Each of the uplink antennas can receive left-hand circular polarized (LHCP) signals and right-hand circular polarized (RHCP) signals transmitted to the antenna over predefined channels of a "receive" frequency band. Preferably, the receive band is located between 29.5 GHz and 30.5 GHz on the frequency spectrum. In accordance with established international convention, the channels located between 29.5 GHz and 30 GHz on the receive band are allocated for commercial (e.g., civilian) user applications, and the channels located between 30.0 GHz to 30.5 GHz on the receive band are allocated for military (e.g., government) user applications. Preferably, each of the channels of the receive band has a bandwidth of 36 MHz.

According to a preferred embodiment of the invention, a first set of twelve civilian channels (also referred to as "receive band LHCP civilian channels") located between 29.5 GHz and 30 GHz on the receive band are allocated for LHCP signals. A second set of twelve civilian channels (also referred to as "receive band RHCP civilian channels") located between 29.5 GHz and 30 GHz on the receive band are allocated for RHCP signals. Similarly, there is preferably a first set of twelve military channels (also referred to as "receive band LHCP military channels") located between 30 GHz and 30.5 Ghz on the receive band allocated for LHCP signals, and there is a second set of twelve military channels (also referred to as "receive band RHCP military channels") located between 29.5 GHz and 30 GHz on the receive band allocated for RHCP signals.

In a preferred embodiment of the invention, center frequencies of adjacent ones of the receive band LHCP civilian channels are separated by 40 MHz, and center frequencies of adjacent ones of the receive band RHCP civilian channels are separated by 40 MHz. Also in the preferred embodiment of the invention, center frequencies of adjacent ones of the receive band LHCP military channels are separated by 40 MHz, and center frequencies of adjacent ones of the receive band RHCP military channels are spaced apart by 40 MHz.

Uplinks from the terrestrial stations to the antennas of the CDBS system may include LHCP signal portions and RHCP signal portions having frequencies within any of the predefined military and civilian channels of the receive band. After signals are uplinked from one or more of the terrestrial stations to the uplink antennas, the uplink antennas forward the received uplink signals to respective ones of a plurality of orthomode transducers. Each orthomode transducer separates the LHCP portions of the signals applied to the orthomode transducer from the RHCP portions of the signals applied to the orthomode transducer, and then forwards these portions of the signals to a respective one of a plurality of receivers. Each receiver amplifies and converts signals that are applied to the receiver to signals that are within channels of a "transmit" band.

According to a preferred embodiment of the invention, the transmit band is located between 19.7 GHz and 20.7 GHz on the frequency spectrum. In accordance with established international convention, the channels located between 19.7 GHz and 20.2 GHz on the transmit band are allocated for civilian applications, and the channels located between 20.2 GHz and 20.7 GHz on the transmit band are allocated for military applications. Each of the channels of the transmit band preferably has a bandwidth of 36 MHz.

Also in the preferred embodiment of the invention, there are twelve civilian channels located between 19.7 GHz and 20.2 GHz on the transmit band that correspond to the twelve receive band LHCP civilian channels, and there are another twelve civilian channels located between 19.7 GHz and 20.2 GHz on the transmit band that correspond to the twelve receive band RHCP civilian channels. Similarly, there are preferably twelve military channels located between 20.2 GHz and 20.7 GHz on the transmit band that correspond to the twelve receive band military LHCP channels, and there are preferably another twelve military channels located between 20.2 GHz and 20.7 GHz on the transmit band that correspond to the twelve receive band military RHCP channels.

Signals that are output by each individual receiver are divided into a respective plurality (e.g., four) of corresponding equivalent signals by a respective one of a plurality of groups of hybrids. Thereafter, signals that are output by the plurality of groups of hybrids are applied to a plurality of receive beam select switches. Each receive beam select switch receives a pair of signals that are output from a respective pair of the groups of hybrids, and is controllable by a controller for selectively coupling one of these signals to an associated one of a plurality of input multiplexers (IMUXs). The receive beam select switches enable selections to be made of signals having frequencies that are within specific frequency channels, and that were received by a specific one of the uplink antennas, for possible subsequent downlink transmission. The control of the receive beam select switches may be performed in accordance with, for example, a signal supplied to the spacecraft from a terrestrial network control station, or in accordance with information stored in the controller.

Signals that are output from individual ones of the receive beam select switches are coupled to inputs of respective ones of the IMUXs. Each IMUX enables signals that are applied to the IMUX, and which are from individual ones of the transmit band channels, to be separated from other transmit band channel signals applied to the IMUX. After an IMUX separates channel signals in this manner, the IMUX forwards the separated channel signals to a respective group or set of band select switches. Each band select switch may receive a respective military channel signal and/or a respective civilian channel signal from an associated IMUX, depending on the frequencies of the signals originally applied to the IMUX.

Each band select switch is controllable by the controller for selectively coupling ("down-selecting") one of the signals applied to the switch to inputs of an input redundancy switching ring of a respective amplification section. The controller controls the sets of band select switches in accordance with information stored in the controller or information received by the spacecraft from the terrestrial network control station.

In the preferred embodiment of the invention, each amplification section comprises a respective input redundancy switching ring, four communication paths, and an output redundancy switching ring. The input redundancy switching ring of each respective amplification section has inputs that are coupled to respective outputs of a respective set of the band select switches. The input redundancy switching ring of each amplification section directs signals that are applied to the ring to selected ones of the communication paths of the amplification section, as controlled by the controller. The ring can be controlled in accordance with information stored in the controller, or in accordance with information received by the spacecraft from the terrestrial network control station.

Each of the communication paths preferably comprises an input hybrid, a first and a second traveling wave tube amplifier (TWTA), a pair of circulators, and an output hybrid. Within each communication path, after a signal has been forwarded to the hybrid of the path, the signal is split into two portions by the hybrid. Thereafter, the two portions of the signal are amplified by the TWTAs of the path and the amplified signal portions are forwarded to the output hybrid via the circulators of the path.

The output hybrids of the respective communication paths coherently combine the signal portions that are applied to the respective output hybrids, and then output resultant combined signals to the respective output redundancy switching rings of the respective amplification sections. The output redundancy switching ring of each amplification section, directs signals that are applied to the ring to selected ones of a respective group of output band select switches, as controlled by the controller. Each output redundancy switching ring may be controlled by the controller in accordance with information stored in the controller, or in accordance with information received by the spacecraft from the terrestrial network control station.

Each individual output band select switch is controllable by the controller for directing a signal that is applied to the switch to either a respective one of a first group of inputs of an associated output multiplexer (OMUX), or to a respective one of a second group of inputs of the OMUX. Each output band select switch is also controllable by the controller in accordance with information stored in the controller, or in accordance with information received by the spacecraft from the terrestrial network control station.

Within each OMUX associated with a respective one of the amplification sections, signals that are received by the OMUX are combined, and are thereafter provided to a respective one of a plurality of steerable "downlink" antennas. Each of the downlink antennas downlinks signals that are applied to the antenna to a pre-selected coverage region on the earth.

Depending upon the frequencies of the signals originally uplinked to the spacecraft, and upon the selections made by the various switches of the CDBS system as controlled by the controller in accordance with applicable mission requirements, signals that are downlinked from the spacecraft may have frequencies that are within any of the military and civilian channels of the transmit band. As such, the CDBS system of the invention enables the spacecraft to provide communications service for both military and civilian users simultaneously.

BRIEF DESCRIPTION OF THE DRAWINGS

The above set forth and other features of the invention are made more apparent in the ensuing description of the invention when read in conjunction with the attached drawings, wherein:

FIG. 1 shows a relationship between FIGS. 1a, 1b, and 1c;

FIG. 1c shows a block diagram of a further portion of the CDBS system constructed in accordance with the invention;

FIG. 2b shows a diagram of a "receive" band that includes channels allocated for civilian and military user applications;

FIG. 2c shows a diagram of a "transmit" band that includes channels allocated for civilian and military user applications;

FIG. 2d shows a portion of the receive band of FIG. 2b allocated for left-hand circular polarized (LHCP) signals;

FIG. 2e shows channels of a portion of the transmit band of FIG. 2c;

FIG. 3 shows a block diagram of a filter bank of individual input multiplexers (IMUXS) of the CDBS system of FIG. 1a;

DETAILED DESCRIPTION OF THE INVENTION

Figure 1A:
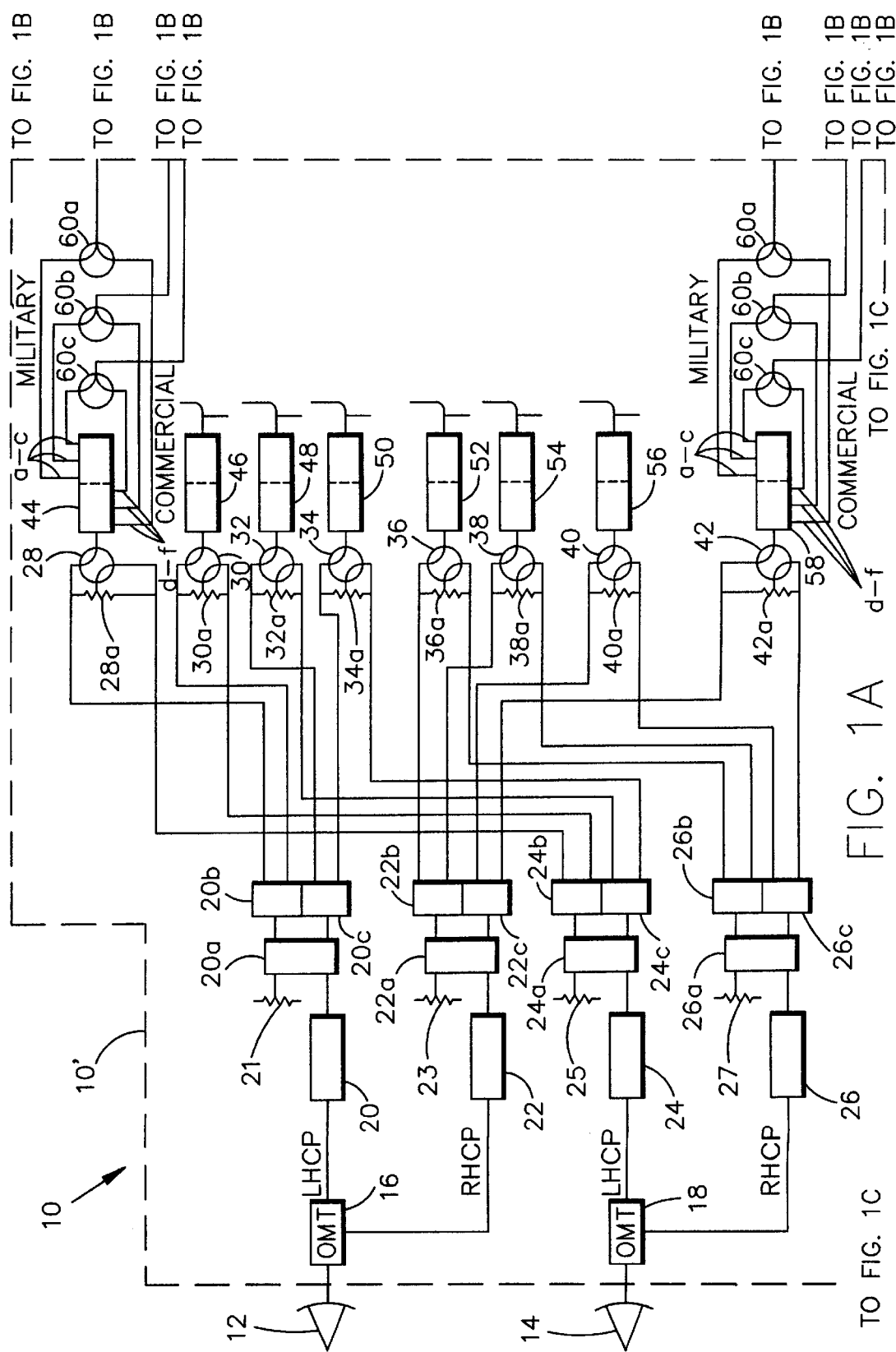
FIG. 1a shows a block diagram of a portion of a Common Direct Broadcasting Service (CDBS) system that is constructed in accordance with the invention.
Figure 1B:
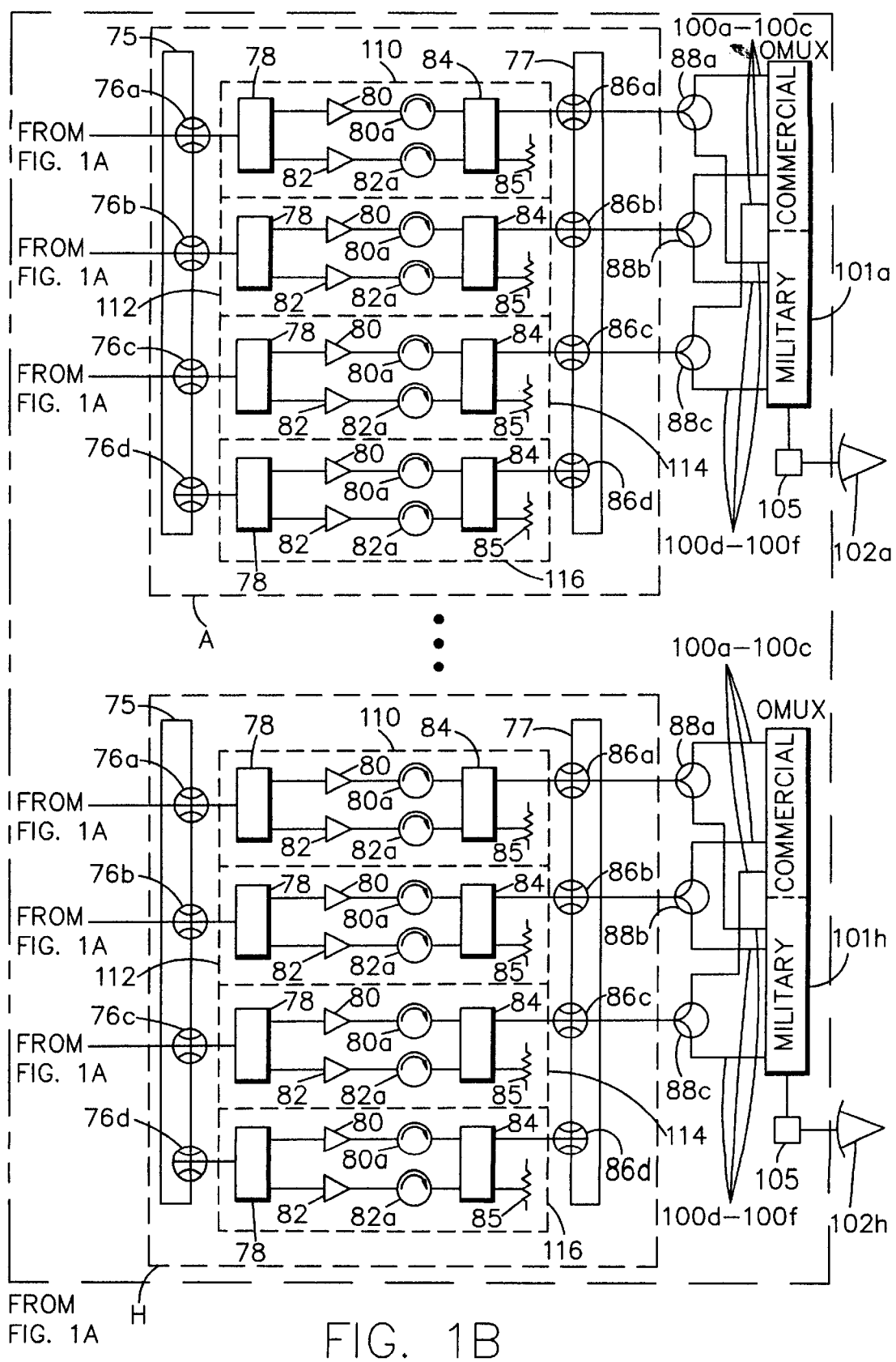
FIG. 1b shows a block diagram of another portion of the CDBS system constructed in accordance with the invention.
Figure 2A:
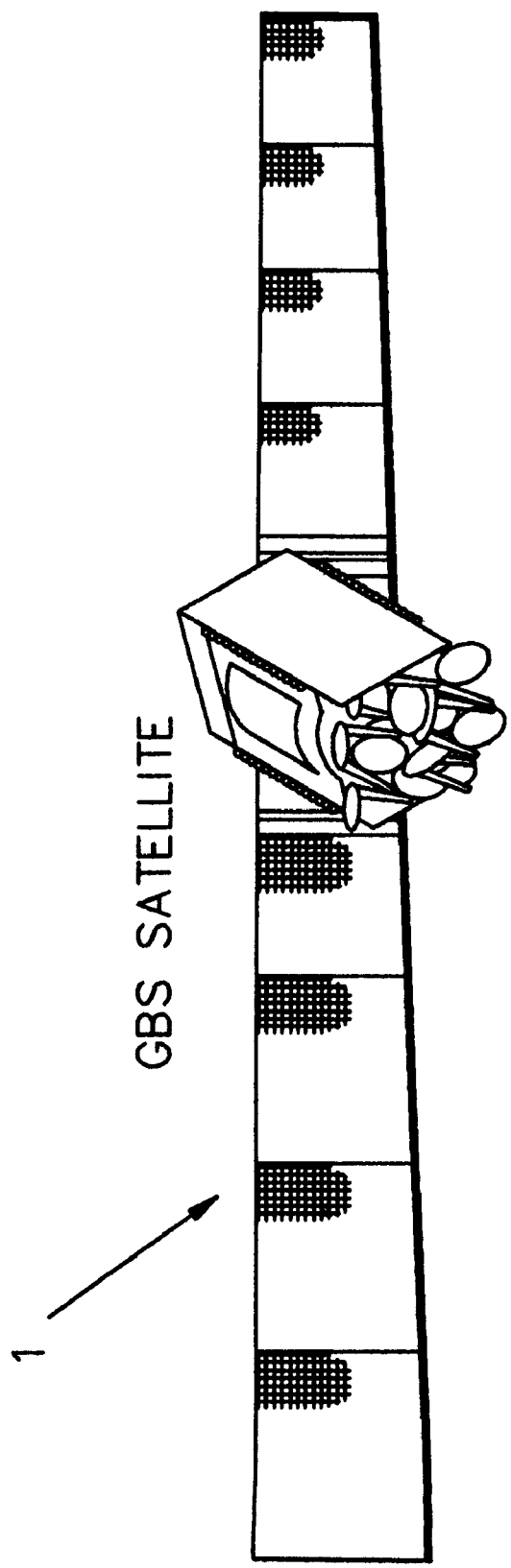
FIG. 2a shows a Global Broadcasting Service satellite.

FIGS. 1a and 1b show a block diagram of a Common Direct Broadcasting Service (CDBS) system 10 that is constructed in accordance with the invention. The CDBS system 10 may be employed in any suitable communications spacecraft, such as, by example, a communications satellite. An exemplary communications satellite, namely a Global Broadcasting Service (GBS) satellite 1, is shown in FIG. 2a. For the purposes of this description, it is assumed that the CDBS system 10 is being employed in the GBS satellite 1.

The CDBS system 10 enables the GBS satellite 1 to effect communications between civilian users and between military users simultaneously, and thus enables the GBS satellite 1 to service a larger customer base than has been serviced by conventional communication satellites. The manner in which the CDBS system 10 functions will be further described below.

The CDBS system 10 can broadcast digital data over a highly efficient waveform, and preferably includes circuitry (not shown) for performing state-of-the-art forward error correction coding techniques with concatenated coding to enable the CDBS system 10 to provide a data throughput rate of at least 648 Mbits per second to user terminals that employ conventional commercial decoder boxes.

Figure 4:
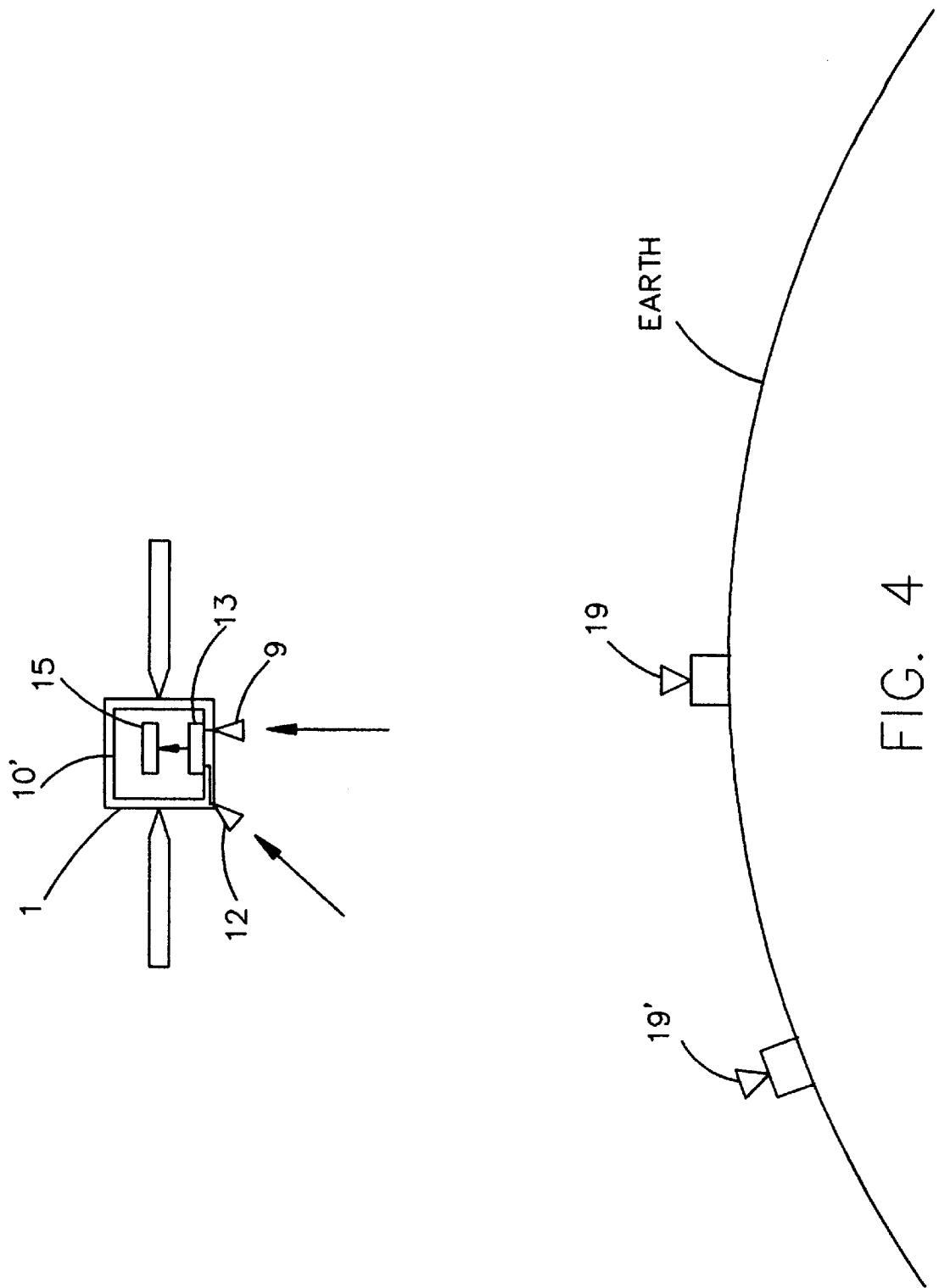
FIG. 4 shows the Global Broadcasting Service satellite of FIG. 2a, a terrestrial network control station 19, and a terrestrial station 19', wherein the Global Broadcasting Service satellite includes the CDBS system of FIGS. 1a and 1b.

Referring to FIGS. 1a and 1c, the CDBS system 10 preferably comprises at least two "uplink" antennas 12 and 14 for receiving signals that are uplinked to the GBS satellite 1 from user terminals. The CDBS system 10 also preferably comprises an uplink antenna 9 for receiving signals that are uplinked to the GBS satellite 1 from a terrestrial network control station 19 (FIG. 4). In a preferred embodiment of the invention, each antenna 9, 12, and 14 is a steerable spot beam antenna having an 18" diameter and a coverage area of at least 500 nautical miles. A pointing control circuit 17 adjusts the steering of the antennas 9, 12, and 14, as controlled by a communications controller 15. The antenna 9 is controlled by the controller 15 to point towards the terrestrial network control station 19 using any suitable technique, including, for example, an automatic tracking technique.

Preferably, the antennas 12 and 14 are controlled by the controller 15 to point towards different regions on the earth, depending upon antenna coverage area requirements for a particular application of interest. By example, one of the antennas 12 and 14 may be controlled to point towards a "theater" region on the earth where military hostilities are occurring, in order to provide coverage for military users located within this region. In theater regions, mobile terrestrial stations (e.g., terminals) are often used rather than fixed terrestrial stations, which may be unsuitable for such regions. Also by example, the other one of the antennas 12 and 14 may be controlled to point towards a "sanctuary" region on the earth where no military hostilities are present and where only commercial (e.g., civilian) users are located. In this case, the antenna provides coverage for the commercial users in the sanctuary region. In sanctuary regions, fixed and/or mobile terrestrial stations (e.g., terminals) are often employed.

The technique used by the controller 15 for controlling the steering of the antennas 12 and 14 may be any suitable technique, including, for example, an automatic tracking technique. Also, the directions in which the controller 15 points the antennas 12 and 14 can be determined based upon information uplinked to the GBS satellite 1 from the terrestrial network control station 19. This may be understood in view of FIG. 4, which shows the GBS satellite 1, a terrestrial station or terminal 19', and the terrestrial network control station 19. The block labelled 10' in FIG. 4 represents the CDBS system 10, excluding antennas 102A–102H, 12, and 14 of the CDBS system 10. For the purposes of clarity, only the antennas 9 and 12 are shown in FIG. 4. A signal carrying antenna pointing information specifying that the antenna 12 point towards terrestrial terminal 19' may be uplinked from the terrestrial network control station 19 to the antenna 9 of the GBS satellite 1. After the signal is received by the antenna 9, the signal is converted to baseband by a communications processor 13, which then extracts the antenna pointing information from the signal and supplies this information to the controller 15. Thereafter, based upon the antenna pointing information, the controller 15 steers the antenna 12 via the pointing control circuit 17 to point towards the terrestrial terminal 19'.

Each of the uplink antennas 12 and 14 can receive left-hand circular polarized (LHCP) signals and right-hand circular polarized (RHCP) signals transmitted to the antenna over predefined channels of a "receive" frequency band. Preferably, the receive band is located between 29.5 GHz and 30.5 GHz on the frequency spectrum, and each channel of the receive band has a bandwidth of 36 MHz. In accordance with established international convention, the channels located between 29.5 GHz and 30 GHz on the receive band are allocated for commercial (e.g., civilian) user applications, and the channels located between 30.0 GHz to 30.5 GHz on the receive band are allocated for military (e.g., government) user applications. A diagram showing the receive band, including "civilian" channels and "military" channels, is shown in FIG. 2b. The civilian and military channels provide a receive Ka-band which is formed of two contiguous, 500 MHz wide civilian-allocated and military-allocated frequency bands.

Figure 2F:
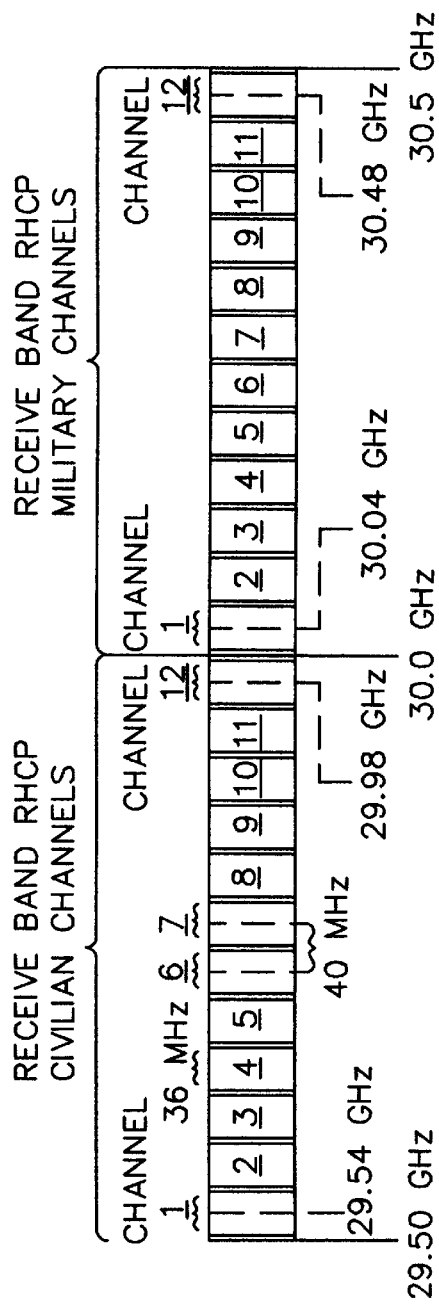
FIG. 2f shows a portion of the receive band of FIG. 2b allocated for right-hand circular polarized (RHCP) signals.

According to a preferred embodiment of the invention, and referring to FIGS. 2d and 2f, a portion of the receive band located between 29.5 GHz and 30.0 GHz includes a first set of twelve civilian channels (also referred to as "receive band LHCP civilian channels") that are allocated for LHCP signals, and another portion of the receive band located between 29.5 GHz and 30.0 GHz includes a second set of twelve civilian channels (also referred to as "receive band RHCP civilian channels") that are allocated for RHCP signals. The twelve receive band LHCP civilian channels (numbered "1–12") preferably have center frequencies similar to those respective ones shown in the following Table A.

TABLE A

| Channel | Center Frequency (GHz) |
| --- | --- |
| 1 | 29.520 |
| 2 | 29.560 |
| 3 | 29.600 |
| 4 | 29.640 |
| 5 | 29.680 |
| 6 | 29.720 |
| 7 | 29.760 |
| 8 | 29.800 |
| 9 | 29.840 |
| 10 | 29.880 |

TABLE A-continued

| Channel | Center Frequency (GHz) |
|---|---|
| 11 | 29.920 |
| 12 | 29.960 |

Similarly, the twelve receive band RHCP civilian channels (numbered "1–12") preferably have center frequencies similar to those respective ones shown in the following Table B.

TABLE B

| Channels | Center Frequency (GHz) |
|---|---|
| 1 | 29.540 |
| 2 | 29.580 |
| 3 | 29.620 |
| 4 | 29.660 |
| 5 | 29.700 |
| 6 | 29.740 |
| 7 | 29.780 |
| 8 | 29.820 |
| 9 | 29.860 |
| 10 | 29.900 |
| 11 | 29.940 |
| 12 | 29.980 |

Also in accordance with the preferred embodiment of the invention, a portion of the receive band located between 30.0 GHz and 30.5 GHz includes a first set of twelve military channels (also referred to as "receive band LHCP military channels") that are allocated for LHCP signals, and another portion of the receive band located between 30.0 GHz and 30.5 GHz includes a second set of twelve military channels (also referred to as "receive band RHCP military channels") that are allocated for RHCP signals. The twelve receive band LHCP military channels (numbered "1–12") preferably have center frequencies similar to those respective ones shown in the following Table C.

TABLE C

| Channels | Center Frequency (GHz) |
|---|---|
| 1 | 30.020 |
| 2 | 30.060 |
| 3 | 30.100 |
| 4 | 30.140 |
| 5 | 30.180 |
| 6 | 30.220 |
| 7 | 30.260 |
| 8 | 30.300 |
| 9 | 30.340 |
| 10 | 30.380 |
| 11 | 30.420 |
| 12 | 30.460 |

Similarly, the twelve receive band RHCP military channels (numbered "1–12") preferably have center frequencies similar to those respective ones shown in the following Table D.

TABLE D

| Channels | Center Frequency (GHz) |
|---|---|
| 1 | 30.040 |
| 2 | 30.080 |
| 3 | 30.120 |
| 4 | 30.160 |
| 5 | 30.200 |
| 6 | 30.240 |
| 7 | 30.280 |
| 8 | 30.320 |
| 9 | 30.360 |
| 10 | 30.400 |
| 11 | 30.440 |
| 12 | 30.480 |

Also in accordance with the preferred embodiment of the invention, center frequencies of adjacent ones of the receive band LHCP civilian channels are separated by 40 MHz, and center frequencies of adjacent ones of the receive band RHCP civilian channels are separated by 40 MHz. Similarly, center frequencies of adjacent ones of the receive band LHCP military channels are preferably separated by 40 MHz, and center frequencies of adjacent ones of the receive band RHCP military channels are preferably separated by 40 MHz.

Figure 5:
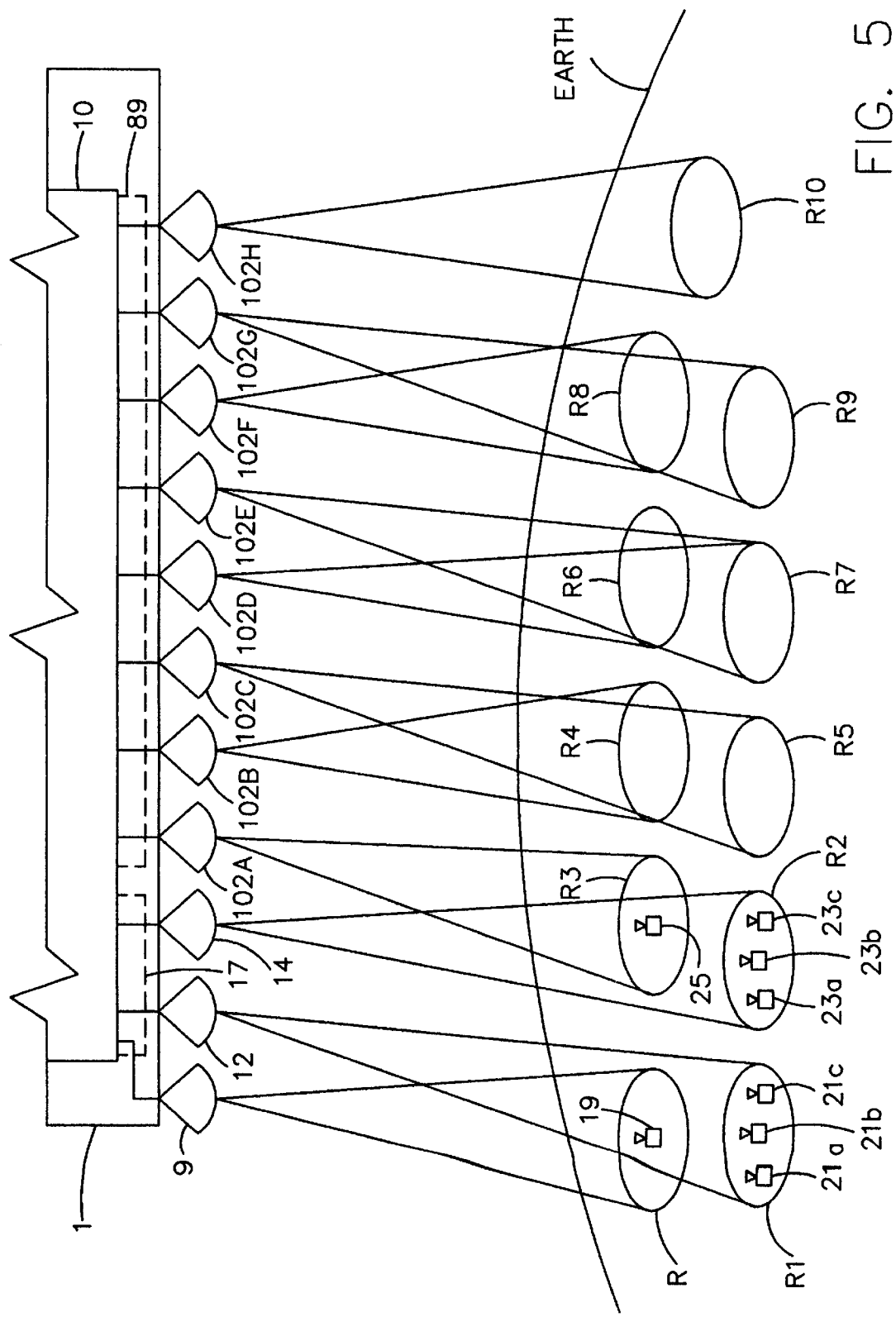
FIG. 5 shows a portion of the Global Broadcasting Service satellite of FIG. 2a, including a portion of the CDBS system of FIGS. 1a and 1b, and various earth coverage regions of antennas of the CDBS system.

Referring to FIGS. 1b and 5, the CDBS system 10 also comprises a plurality of "downlink" antennas 102A–102H that are for downlinking signals from the GBS satellite 1 to designated coverage areas. In accordance with a preferred embodiment of the invention, each of the antennas 102A–102H is a spot beam antenna having a 26"diameter. Each antenna 102A–102H is steerable, as controlled by the controller 15 over an antenna pointing control circuit 89 (FIG. 1a). The particular regions on the earth towards which the antennas 102A–102H point are determined in accordance with applicable downlink coverage area requirements for a particular application of interest. As for the uplink antennas 12 and 14, the technique used by the controller 15 to control the steering of the antennas 102A–102H may be any suitable technique such as, by example, an automatic tracking technique. Also, the directions in which the antennas 102A–102H are steered can be determined based upon information supplied to the satellite 1 from the terrestrial network control station 19, in a similar manner as was described above.

According to a preferred embodiment of the invention, the downlink antennas 102A–102H are gimbaled over ±9° along two axes in order to provide nearly complete coverage of a portion of the earth that is in view of the GBS satellite 1. Preferably, each antenna 102A–102H can downlink signals at a data rate of at least 27 Mbits per second per channel. Also in accordance with the preferred embodiment of the invention, each downlink antenna 102A–102H provides an Effective Isotropic Radiated Power ("EIRP") value per channel that is at least 56 dBW at an edge of the coverage area of the antenna, and also provides an EIRP value of at least 59 dBW at a peak of a beam downlinked by the antenna. For a case in which, by example, fixed, pointed 18" ground terminals are being employed, these EIRP values enable there to be approximately 8.5 dB of available margin at an edge of the coverage area per channel. Also by example, for a case in which the CDBS system 10 is being employed to receive signals from, and to rebroadcast signals to, terrestrial stations located in areas experiencing inclement weather conditions, and wherein, as a result, additional margin is required, an incrementally smaller data rate can be provided to as slow as 1.544 Mbits per second (e.g., T1 rate). A data rate of 1.544 Mbits per second allows there to be an additional margin of about 12.4 db, a total margin of approximately 20.9 db, and a beam throughput of about 4.6 Mbits per second.

The use of the antennas 102A–102H to downlink signals from the GBS satellite 1 to designated coverage areas will be further described below.

The manner in which the CDBS system 10 functions will now be described. In the following description, it is assumed that the uplink antennas 12 and 14 and the downlink antennas 102A–102H have been steered by the controller 15 to point towards specific regions on the earth in accordance with applicable mission coverage area requirements. By example, and referring to FIG. 5, it is assumed that the antennas 12 and 14 have been steered to point towards regions on the earth labelled R1 and R2, respectively. Similarly, it is assumed that the antennas 102A–102H have been steered to point towards regions on the earth labelled R3–R10, respectively. It is also assumed that antenna 9 is pointing towards region R, wherein the terrestrial network control station 19 is located.

Signals that are uplinked from terrestrial stations and/or user terminals located within the coverage area regions R1 and R2 of the respective uplink antennas 12 and 14 are received by these respective antennas 12 and 14. By example, antenna 12 receives signals that are uplinked to the GBS satellite 1 from terrestrial stations 21a, 21b, and 21c, which are located within the region R1, and antenna 14 receives signals that are uplinked from terrestrial stations 23a, 23b, and 23c, which are located within region R2. Each of the signals that are uplinked to the GBS satellite 1 from the respective terrestrial stations 21a–21c and 23a–23c can include LHCP signal portions and RHCP signal portions. As is known in the art, LHCP signals have polarizations that are orthogonal to those of RHCP signals (i.e., the electric fields of LHCP signals are orientated orthogonally to those of RHCP signals). As such, LHCP signals that are transmitted from each individual terrestrial station 21a–21c and 23a–23c are permitted to have nearly similar frequencies as RHCP signals that are transmitted from the same respective terrestrial stations, and no interference occurs between these signals. The uplinks from the terrestrial stations 21a–21c and 23a–23c may include signals having frequencies that are within any of the military and civilian channels of the receive band.

After signals are uplinked from one or more of the terrestrial stations 21a–21c to the antenna 12, the antenna 12 provides the uplinked signals to an orthomode transducer (hereinafter referred to as an "OMT") 16. The orthomode transducer 16 separates the LHCP portions of the signals from the RHCP portions of the signals, and then forwards these portions of the signals to receivers 20 and 22, respectively.

After signals are uplinked from one or more of the terrestrial stations 23a–23c to the antenna 14, the uplinked signals are provided from the antenna 14 to an OMT 18. The OMT 18 separates LHCP portions of the signals from RHCP portions of the signals. The LHCP and RHCP portions of the uplinked signals are then forwarded to receivers 24 and 26, respectively.

Signals that are applied to the receivers 20–26 are amplified and converted to corresponding signals having frequencies that are within channels of a predefined transmit band, as will be further described below. According to a preferred embodiment of the invention, and referring to FIG. 2c, the transmit band is located between 19.7 GHz and 20.7 GHz on the frequency spectrum. In accordance with established international convention, the channels of the transmit band located between 19.7 GHz and 20.2 GHz are allocated for civilian user applications, and the channels of the transmit band located between 20.2 GHz and 20.7 GHz are allocated for military user applications. These "civilian" and "military" channels provide two contiguous, 500 MHz frequency bands that form a transmit Ka-band.

In a preferred embodiment of the invention, and referring to FIG. 2e, twelve civilian channels (T1') of the transmit band located between 19.7 GHz and 20.2 GHz correspond to respective ones of the twelve receive band LHCP civilian channels of FIG. 2d. The twelve civilian channels (T1') (numbered as "1–12") of the transmit band preferably have center frequencies similar to those respective ones shown in the following Table E.

TABLE E

| Channels | Center Frequency (GHz) |
|---|---|
| 1 | 19.72 |
| 2 | 19.76 |
| 3 | 19.80 |
| 4 | 19.84 |
| 5 | 19.88 |
| 6 | 19.92 |
| 7 | 19.96 |
| 8 | 20.00 |
| 9 | 20.04 |
| 10 | 20.08 |
| 11 | 20.12 |
| 12 | 20.16 |

There are also preferably twelve military channels (T2') located between 20.2 GHz and 20.7 GHz on the transmit band that correspond to respective ones of the twelve receive band military LHCP channels of FIG. 2d. The twelve military channels (T2') (numbered "1–12") preferably have center frequencies similar to those respective ones shown in the following Table F.

TABLE F

| Channels | Center Frequency (GHz) |
|---|---|
| 1 | 20.22 |
| 2 | 20.26 |
| 3 | 20.30 |
| 4 | 20.34 |
| 5 | 20.38 |
| 6 | 20.42 |
| 7 | 20.46 |
| 8 | 20.50 |
| 9 | 20.54 |
| 10 | 20.58 |
| 11 | 20.62 |
| 12 | 20.66 |

Figure 2G:
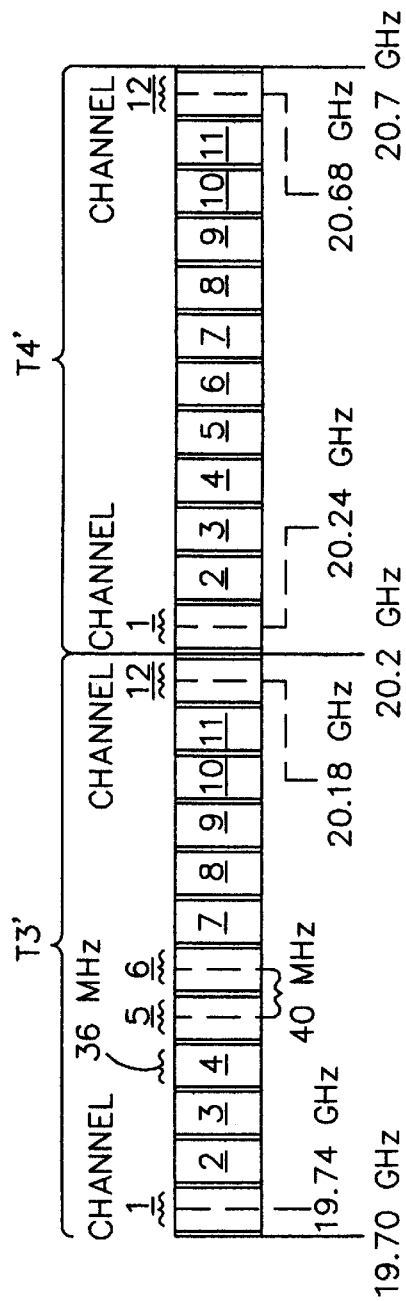
FIG. 2g shows channels of another portion of the transmit band of FIG. 2c.

Additionally, and referring to FIG. 2g, there are preferably twelve civilian channels (T3') (numbered "1–12") located within the transmit band between 19.7 GHz and 20.2 GHz which correspond to respective ones of the twelve receive band RHCP civilian channels of FIG. 2f. The twelve civilian channels (T3') preferably have center frequencies similar to those respective ones shown in the following Table G.

TABLE G

| Channels | Center Frequency (GHz) |
| --- | --- |
| 1 | 19.74 |
| 2 | 19.78 |
| 3 | 19.82 |
| 4 | 19.86 |
| 5 | 19.90 |
| 6 | 19.94 |
| 7 | 19.98 |
| 8 | 20.02 |
| 9 | 20.06 |
| 10 | 20.10 |
| 11 | 20.14 |
| 12 | 20.18 |

There are also preferably twelve military channels (T4') located on the transmit band between 20.2 GHz and 20.7 GHz which correspond to respective ones of the twelve receive band military RHCP channels shown in FIG. 2f. The twelve military channels (T4') (numbered "1–12") of the transmit band preferably have center frequencies similar to those respective ones shown in the following Table H.

TABLE H

| Channels | Center Frequency (GHz) |
| --- | --- |
| 1 | 20.24 |
| 2 | 20.28 |
| 3 | 20.32 |
| 4 | 20.36 |
| 5 | 20.40 |
| 6 | 20.44 |
| 7 | 20.48 |
| 8 | 20.52 |
| 9 | 20.56 |
| 10 | 20.60 |
| 11 | 20.64 |
| 12 | 20.68 |

In the preferred embodiment of the invention, center frequencies of adjacent ones of the transmit band civilian channels (T1') are separated by 40 MHz, and center frequencies of adjacent ones of the transmit band military channels (T2') are separated by 40 MHz. Also in a preferred embodiment of the invention, center frequencies of adjacent ones of the transmit band civilian channels (T3') are separated by 40 MHz, and center frequencies of adjacent ones of the transmit band military channels (T4') are separated by 40 MHz. Preferably, each of the channels of the transmit band has a bandwidth of 36 MHz.

As described above, the receivers 20–26 amplify and convert signals that are located within individual channels of the receive band to signals having frequencies within corresponding channels located within the transmit band. More particularly, in response receiving LHCP signal portions from OMT 16, the receiver 20 outputs signals having frequencies within individual ones of the transmit band channels (T1') and (T2') corresponding to the receive band channels of the LHCP signal portions. By example, for a case in which a LHCP signal portion having a frequency of approximately 29.52 GHz (i.e., within channel #1 of the receive band LHCP civilian channels shown in FIG. 2d) is applied to receiver 20, the receiver 20 amplifies and converts the frequency of the signal portion to a frequency of approximately 19.72 GHz (i.e., within channel #1 of the transmit band civilian channels (T1') shown in FIG. 2e). Similarly, in response to receiving RHCP signal portions from the OMT 16, receiver 22 outputs signals having frequencies within individual ones of the transmit band channels (T3') and (T4') corresponding to the receive band channels of the RHCP signal portions. By example, for a case in which a RHCP signal portion having a frequency of approximately 29.98 GHz (i.e., within channel #12 of the receive band RHCP civilian channels shown in FIG. 2f) is applied to receiver 22, the receiver 22 amplifies and converts the frequency of the signal portion to a frequency of approximately 20.18 GHz (i.e., within channel #12 of the transmit band civilian channels (T3') shown in FIG. 2g). In a similar manner, receiver 24 outputs signals within individual ones of the transmit band channels (T1') and (T2') corresponding to receive band channels of the LHCP signal portions forwarded to the receiver 24 from OMT 18. Also, receiver 26 outputs signals within individual ones of the transmit band channels (T3') and (T4') corresponding to receive band channels of the RHCP signal portions forwarded to the receiver 26 from the OMT 18.

As can be appreciated, depending on the channels of the signals originally uplinked to the GBS satellite 1, the receivers 20 and 24 may output signals within all or less than all of the transmit band channels (T1') and (T2'), and the receivers 22 and 26 may output signals within all or less than all of the transmit band channels (T3') and (T4'). It should be noted that technique employed by the receivers 20–26 for converting the receive band channel signals to transmit band channel signals may be any suitable technique known in the art.

After signals are output by each receiver 20–26, the signals are divided into a plurality of portions by respective groups of three hybrids. More particularly, the output signals of individual ones of the receivers 20, 22, 24, and 26 are provided to first inputs of hybrids 20a, 22a, 24a, and 26a, respectively. Hybrid 20a splits the signals that are output by receiver 20 into two corresponding portions and then forwards these portions to hybrids 20b and 20c, respectively. Hybrid 22a splits the signals that are output by receiver 22 into two similar portions and then forwards these portions to hybrids 22b and 22c, respectively. Hybrid 24a splits the signals that are output by receiver 24 into two similar portions and then forwards these portions to hybrids 24b and 24c, respectively. Similarly, hybrid 26a splits the signals that are output by receiver 26 into two similar portions and then forwards these portions to hybrids 26b and 26c, respectively. As shown in FIG. 1a, load resistors 21, 23, 25, and 27 may be employed. These resistors 21, 23, 25 and 27 may be coupled to second inputs of the respective hybrids 20a, 22a, 24a, and 26a in order to provide an impedance match to these inputs to prevent power from reflecting back to the receivers 20–26.

Each of the hybrids 20b, 20c, 22b, 22c, 24b, 24c, 26b, and 26c splits signals that are applied to the hybrid into two similar portions, and then forwards these signal portions to a respective pair of receive beam select switches. More particularly, hybrids 20b and 24b split signals that are applied to the respective hybrids 20b and 24b. Thereafter, hybrid 20b provides a first output to a first input of a receive beam select switch 28, and hybrid 24b provides a first output to a second input of receive beam select switch 28. A second output of the hybrid 20b, and a second output of the hybrid 24b are also forwarded to first and second inputs, respectively, of a receive beam select switch 30. Similarly, hybrids 20c and 24c split signals that are applied to the respective hybrids 20c and 24c and, thereafter, hybrid 20c provides a first output to a first input of a receive beam select switch 32, and hybrid 24c provides a first output to a second input of receive beam select switch 32. A second output of the hybrid 20c, and a second output of the hybrid 24c are also forwarded to first and second inputs, respectively, of a receive beam select switch 34. Also, after splitting signals that are applied to the hybrids 22b and 26b, each of the hybrids 22b and 26b provides a first and a second output to receive beam select switches 36 and 38, respectively. Moreover, after splitting signals that are applied to the hybrids 22c and 26c, first and second outputs of each of the hybrids 22c and 26c are forwarded to respective receive beam select switches 40 and 42. As shown in FIG. 1a, load resistors 28a–42a may be provided. These resistors 28a–42a may be coupled to third inputs of the respective receive beam select switches 28–42 in order to provide an impedance match to these inputs for preventing power from reflecting back to the hybrids 20b, 20c, 22b, 22c, 24b, 24c, 26b, and 26c.

The receive beam select switches 28–42 permit selections to be made of signals received by specific ones of the antennas 12 and 14, for later downlink transmission. The receive beam switches 28–42 may include, by example, waveguide C-switches. Each receive beam select switch 28–42 is controllable by the controller 15 over a switching control circuit 29 for selectively coupling signals applied to one of the inputs of the switch to an associated one of eight input multiplexers (hereinafter also referred to as "IMUXs") 44–58, in accordance with information stored in the controller 15 or other information received by the GBS satellite 1 from the terrestrial network control station 19. The information may specify, for example, the specific selections needed to be made by the receive beam select switches 28–42 in order for the CDBS system 10 to perform in accordance with applicable mission requirements. For example, the information may specify that the switches 28–42 select signals that were received by a specific one of the antennas 12 and 14 for later downlink transmission.

Signals that are output from individual ones of the receive beam select switches 28–42 are coupled to inputs of respective ones of the IMUXs 44–58. Each IMUX 28–42 enables signals that are applied to the IMUX, and which are from individual ones of the transmit band channels, to be separated from other transmit band channel signals applied to the IMUX. Each IMUX 28–42 then routes the separated individual transmit band channel signals to a respective group of band select switches 60a–60c.

Figure 3:
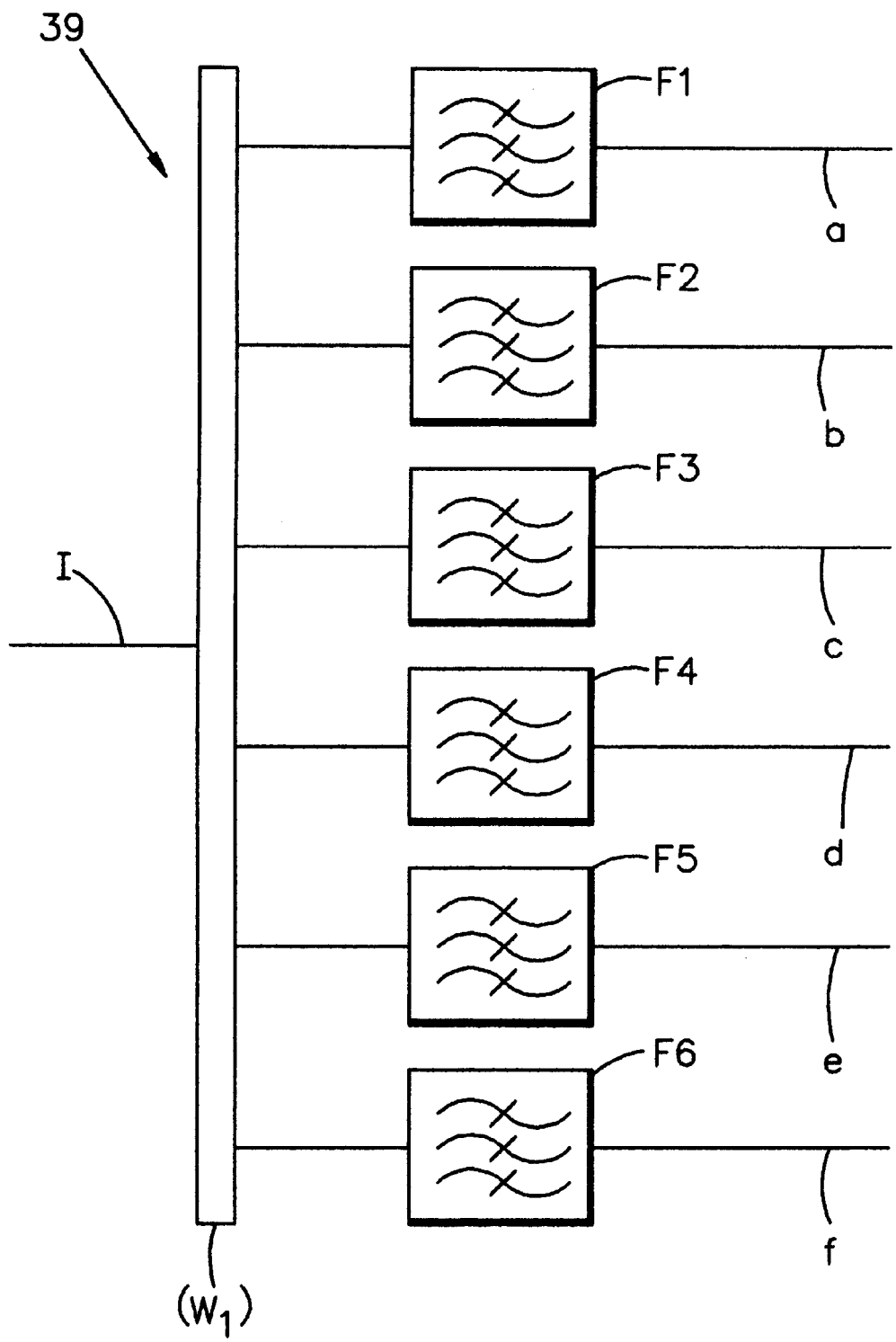

In a preferred embodiment of the invention, each IMUX 44–58 comprises a filter bank that is similar to filter bank 39 shown in FIG. 3. The filter bank 39 preferably includes a waveguide manifold ($W_1$) and six channel filters f1–f6 having different passband frequencies. For convenience, the filters f1–f3 are referred to as "military channel filters" and the filters f4–f6 are referred to as "civilian channel filters".

According to a preferred embodiment of the invention, the passband frequencies of the military channel filters f1–f3 of the IMUXs 44, 46, 48 and 50 are similar to passband frequencies of corresponding ones of the military channels (T2') of the transmit band, as is shown below in Table I. The channel numbers of channel group (T1') corresponding to the filters f1–f3 of the IMUXs 44–50 are shown in the Table I. By example, filters f1–f3 of IMUX 44 have passband frequencies that are similar to those of channels 1, 5 and 9 of channels (T2') of the transmit band. Also in accordance with the preferred embodiment of the invention, the passband frequencies of the civilian channel filters f4–f6 of the IMUXs 44, 46, 48 and 50 are similar to passband frequencies of corresponding ones of the civilian channels (T1') of the transmit band, as is also shown in Table I. The channel numbers of channel group (T2') corresponding to the filters f4–f6 of the IMUXs 44–50 are also shown in the Table I. By example, filters f4–f6 of IMUX 44 have passband frequencies that are similar to those of channels 1, 5 and 9 of channels (T1') of the transmit band.

TABLE I

| IMUX | OMUX | Channels (T2') corresponding to military channel filters: | | | Channels (T1') corresponding to civilian channel filters: | | |
|---|---|---|---|---|---|---|---|
| | | f1 | f2 | f3 | f4 | f5 | f6 |
| 44 | 101a | 1 | 5 | 9 | 1 | 5 | 9 |
| 46 | 101b | 2 | 6 | 10 | 2 | 6 | 10 |
| 48 | 101c | 3 | 7 | 11 | 3 | 7 | 11 |
| 50 | 101d | 4 | 8 | 12 | 4 | 8 | 12 |

It should be noted that Table I also includes a column referring to an "OMUX". This reference will be described below.

Also in the preferred embodiment of the invention, the passband frequencies of the filters f1–f3 of the IMUXs 52, 54, 56 and 58 are similar to the passband frequencies of corresponding ones of the military channels (T4') of the transmit band, as is shown in Table J below. By example, filters f1–f3 of IMUX 52 have passband frequencies that are similar to those of respective channels 1, 5 and 9 of channels (T4') of the transmit band. Further in accordance with the preferred embodiment of the invention, the passband frequencies of the filters f4–f6 of the IMUXs 52, 54, 56 and 58 are similar to those of corresponding ones of the civilian channels (T3') of the transmit band, as is shown in Table J. By example, filters f4–f6 of IMUX 52 have passband frequencies that are similar to those of respective channels 1, 5 and 9 of channels (T3') of the transmit band.

TABLE J

| IMUX | OMUX | Channels (T4') corresponding to military channel filters: | | | Channels (T3') corresponding to civilian channel filters: | | |
|---|---|---|---|---|---|---|---|
| | | f1 | f2 | f3 | f4 | f5 | f6 |
| 52 | 101e | 1 | 5 | 9 | 1 | 5 | 9 |
| 54 | 101f | 2 | 6 | 10 | 2 | 6 | 10 |
| 56 | 101g | 3 | 7 | 11 | 3 | 7 | 11 |
| 58 | 101h | 4 | 8 | 12 | 4 | 8 | 12 |

It should be noted that Table J also includes a column referring to an "OMUX". This reference will be described below.

Referring again to FIG. 3, an input (I) of the filter bank 39 of each IMUX 44–58 forms an input of the IMUX. Within each IMUX 44–58, after signals are received by the input (I) of the IMUX, the signals are split by the waveguide manifold ($W_1$), and are then filtered by each of the filters f1–f6. Signals having frequencies that are within the passbands of the individual filters f1–f6 of the IMUX are passed through the individual filters and are output by the IMUX to a set of band select switches 60a–60c connected to the IMUX. As can be seen, for example, signals that are passed through the filters f1–f3 of IMUX 44 are output from the IMUX 44 over respective outputs (a–c) of the IMUX 44 to first inputs of respective band select switches 60a–60c, which are coupled to the outputs (a–c). Also, signals that are passed through the filters f4–f6 of IMUX 44 are output from the IMUX 44 over respective outputs (d–f) to second inputs of respective ones of the same band select switches 60a–60c. It should be noted that, for the purposes of clarity, outputs (a–f) of the IMUXs 44 and 58 only, and the set of band switches 60a–60c associated with the respective IMUXs 44 and 58 only, are shown in FIG. 1a. However, it is intended that each of the remaining IMUXs 46–56 also have outputs (a–f) and an associated set of band select switches 60a–60c.

As can be appreciated, owing to the selections made by the switches 28–42, at least one half of the total number of receive channel signals originally received by the antennas 12 and 14 are applied to the sets of band select switches 60a–60c. The sets of band select switches 60a–60c enable down-selections to be made of at least one half of the signals applied to the sets of band select switches 60a–60c. Each band select switch 60a–60c of the sets of band select switches is controllable by the controller 15 over a switching control circuit 31 for coupling a selected one of the signals applied to the inputs of the switch to an associated one of four redundancy input switches 76a–76d (FIG. 1b) of an associated amplification section (A–H). More particularly, each of the band select switches 60a–60c is controllable by the controller 15 for "down-selecting" either a signal that is output by a respective one of the military channel filters f1–f3 of an IMUX connected to the respective switch, or a signal that is output by a respective one of the civilian channel filters f4–f6 of the same IMUX. By example, and referring to the band select switched 60a–60c connected to the IMUX 44, the band select switch 60a can be controlled to down-select a signal that is output by either one of the filters f1 and f4 of the IMUX 44. Also, band select switch 60b can be controlled to down-select a signal that is output by either one of the filters f2 and f5 of the IMUX 44, and band select switch 60c can be controlled to down-select a signal that is output by either one of the filters f3 and filter f6 of the IMUX 44.

The controller 15 controls the band select switches 60a–60c in accordance with information stored in the controller 15 or information received by the GBS satellite 1 from the terrestrial network control station 19. The information may specify, by example, that the individual switches 60a–60c select signals having frequencies within specific ones of the transmit band channels over which it is desired to provide a downlink transmission to a terrestrial station covered by one of the antennas 102A–102H. The controlling of these switches 60a–60c thus enables the CDBS system 10 to downlink signals over transmit band channels chosen in accordance with mission requirements for a particular application of interest. The band select switches 60a–60c may include, by example, waveguide C-switches.

After the band select switches 60a–60c of the respective sets of band select switches have "down-selected" signals in the manner described above, the down-selected signals are output from the switches 60a–60c, and are then applied to the amplification sections (A–H) connected to the respective switches 60a–60c. In the preferred embodiment of the invention, each amplification section (A–H) comprises an input redundancy switching ring 75, four communication paths 110, 112, 114, and 116, and an output redundancy switching ring 77. It should be noted that, for the purposes of clarity, only amplification sections (A) and (H) are illustrated. The input redundancy switching ring 75 and the output redundancy switching ring 77 of each amplification section (A–H) may include any suitable type of waveguide redundancy switches known in the art, such as those commonly used in communication satellites.

The input redundancy switching ring 75 of the respective amplification sections (A–H) has inputs that are coupled to respective outputs of a respective set of band select switches 60a, 60b, and 60c. The input redundancy switching ring 75 of each amplification section (A–H) comprises four redundancy input switches 76a–76d. These switches 76a–76d may include, by example, waveguide R-switches. As can be appreciated, the ring 75 of each amplification section (A–H) directs signals that are applied to the ring 75 to selected ones of the communication paths 110, 112, 114, 116 of the amplification section, as controlled by the controller 15 over a switching control circuit 79. By example, the controller 15 may control the switches 76a, 76b, and 76c of each ring 75 to direct signals that are received by the ring 75 from a respective set of band select switches 60a, 60b, and 60c, to the respective communication paths 110, 112, and 114. As another example, for a case in which one or more of the switches 76a, 76b, 76c, 76d and/or communication paths 110, 112, 114, 116 of an amplification section (A–H) fail (e.g., become short circuited), one or more of the switches 76a, 76b, 76c, 76d can be controlled to re-direct signals to one of the remaining functioning switches 76a, 76b, 76c, 76d and communication paths 110, 112, 114, 116, in order to "bypass" the failed portion of the amplification section. The technique used by the controller 15 for controlling the redundancy input switches 76a–76d in response to a failure occurring in one or more of the switches 76a, 76b, 76c, 76d and communication paths 110, 112, 114, 116 may be any suitable technique known in the art. Also, the ring 75 can be controlled in accordance with information stored in the controller 15, or in accordance with information received by the GBS satellite 1 from the terrestrial network control station 19 in the manner described above. The input redundancy switching ring 75 of each amplification section (A–H) may include any suitable type of waveguide redundancy switches known in the art for enabling the ring 75 to function in the above-described manner.

Within each of the respective amplification sections (A–H), each communication path 110, 112, 114, 116 comprises an input hybrid 78, a first and a second traveling wave tube amplifier (also referred to singularly as a "TWTA" or collectively as a "high powered amplifier (HPA)") 80 and 82, circulators 80a and 82a, and an output hybrid 84. Each of the input hybrids 78 of the communication paths 110, 112, 114, and 116 has a respective input that is coupled to an output of a respective one of the switches 76a, 76b, 76c, and 76d of the amplification section. Within each communication path 110, 112, 114, and 116, after a signal has been forwarded to the hybrid 78 from a respective one of the switches 76a, 76b, 76c, and 76d, the signal is split into two portions by the hybrid 78. Thereafter, a first portion of the signal is provided to the first TWTA 80, and a second portion of the signal is applied to the second TWTA 82. The first and second portions of the signal are amplified by the TWTAs 80 and 82, respectively, and are then forwarded to the respective circulators 80a and 82a.

The circulators 80a and 82a couple the respective amplified first and second signal portions to a first input and a second input, respectively, of the output hybrid 84. The output hybrid 84 coherently combines the two amplified signal portions, and thereafter outputs a resultant combined signal to the output redundancy switching ring 77. Each output hybrid 84 is also coupled to a load resistor 85 which prevents signals from being reflected back through the inputs of the hybrid 84, in a similar manner as was described above. According to a preferred embodiment of the invention, each of the TWTAs 80 and 82 provides at least 65 watts of output power so that, when the signals are combined by the output hybrid 84, the power of the combined signal is at least 130 watts.

The output redundancy switching ring 77 of each amplification section (A–H) has inputs that are coupled to outputs of the hybrids 78 from the respective communication paths (110–116) of the amplification section. The output redundancy switching ring 77 of each amplification section (A–H) comprises four redundancy output switches 86a–86d. As can be appreciated, the ring 77 of each amplification section (A–H) directs signals that are applied to the ring 77 to selected ones of three output band select switches 88a–88c, as controlled by the controller 15 over a switching control circuit 81. By example, the switches 86a, 86b, and 86c of each ring 77 can be controlled to forward signals received by the ring 77 directly to the output band select switches 88a, 88b, and 88c, respectively. As for the input redundancy switching ring 75 described above, for a case in which, by example, one or more of the switches 76a, 76b, 76c, 76d, 86a, 86b, 86c, 86d and/or communication paths 110, 112, 114, 116 of an amplification section fail (e.g., become short circuited), one or more of the switches 86a, 86b, 86c, and 86d can be controlled to permit signals received by the respective amplification (A–H) section to be routed via functioning communication paths and switches of the amplification section to the selected ones of the output band select switches 88a, 88b, and 88c. The technique by which the controller 15 controls the switches 88a–88d of each output redundancy switching ring 77 may be any suitable technique known in the art, and the ring 77 can be controlled in accordance with information stored in the controller 15, or in accordance with information received by the GBS spacecraft 1 from the terrestrial network control station 19, in a similar manner as was described above. The output redundancy switching ring 77 of each amplification section (A–H) may include any suitable type of waveguide redundancy switches known in the art for enabling the ring 77 to function in the above-described manner. Also, the switches 88a–88d may include, by example, waveguide C-switches, and the switches 86a–86c may include, for example, waveguide R-switches.

As can be appreciated, the use of two TWTAs 80 and 82 within a single communication path 110–116 provides a higher level of performance reliability than the use of only a single TWTA within a single communication path. By example, if TWTA 80 of the communication path 110 from amplification section (A) were to fail, a portion of a signal that is applied to the communication path 110 is still forwarded through the communication path 110 via the hybrid 78, the TWTA 82, the circulator 82a, and the hybrid 84. In this case, the output signal of the TWTA 82 is divided into two portions by the hybrid 84. A first portion of the signal is then absorbed by the load resistor 85, and a second portion of signal is provided as an output from the communication path 110. As a result, and as can be appreciated, the output power of the communication path 110 in this case is one quarter of that of the signal originally applied to the communication path 110. If this fraction of the power of the original signal is insufficient for a particular application of interest, the rings 75 and 77 may be controlled in the manner described above to route the signals applied to the amplification section (A) so that the signals are forwarded through another selected one of the communication paths 112, 114 and 116, in order to avoid the communication path 110.

As described above, after signals are output by the communication paths 110, 112, 114 and 116 of the individual amplification sections (A–H), the signals are forwarded to output band select switches 88a–88c via the ring 77. Each individual output band select switch 88a–88c is controllable by the controller 15 over a control circuit 83 for directing a signal that is applied to the switch to either a respective one of inputs 100a–100c of a respective output multiplexer (also referred to as an "OMUX") 101a–101h connected to the switch, or to a respective one of inputs 100d–110f of the respective output multiplexer. For example, and referring to the output band select switches 88a–88c that are connected to amplification section (A), the output band select switch 88a is controllable for directing a signal that is applied to the switch to either input 100a or input 100d of the OMUX 101a. Also by example, output band select switch 88b is controllable for directing a signal that is applied to the switch to either input 100b or input 100e of the OMUX 101a, and output band select switch 88c is controllable for directing a signal that is applied to the switch to either input 100c or input 100f of the OMUX 101a. The output band select switches 88a–88c are controlled in accordance with, by example, information stored in the controller 15 or information received by the GBS spacecraft 1 from the terrestrial network control station 19 in a similar manner as was described above. For either case, the information specifies the specific selections needed to be made by the switches 88a–88c in order to enable the GBS satellite 1 to effect communications in accordance with applicable mission requirements. The information is preferably in accordance with that used to control the band select switches 60a–60c which precede the switches 88a–88c in the CDBS system 10 circuitry. The controlling of each set of switches 88a–88c is preferably synchronized with the controlling of the particular set of band select switches 60a–60c that precedes the switches 88a–88c in the system circuitry. In this manner, the switches 88a–88c are controlled so as to select signals to be applied to specific ones of OMUX filters f1–f6 corresponding to the filters f1–f6 outputting the signals selected by the respective band select switches 60a–60c preceding the switches 88a–88c.

It should be noted that, for the purposes of clarity, inputs 100a–100f of the OMUXs 101a and 101h only, and the set of output band select switches 88a–88c associated with the respective OMUXs 101a and 101h only, are shown in FIG. 1b. However, it is intended that each of the remaining OMUXs 101b–101g also have inputs 100a–100c and an associated set of output band select switches 88a–88c. However, it is intended that the components not shown also be provided, including OMUXs 101b–101g.

Figure 6:
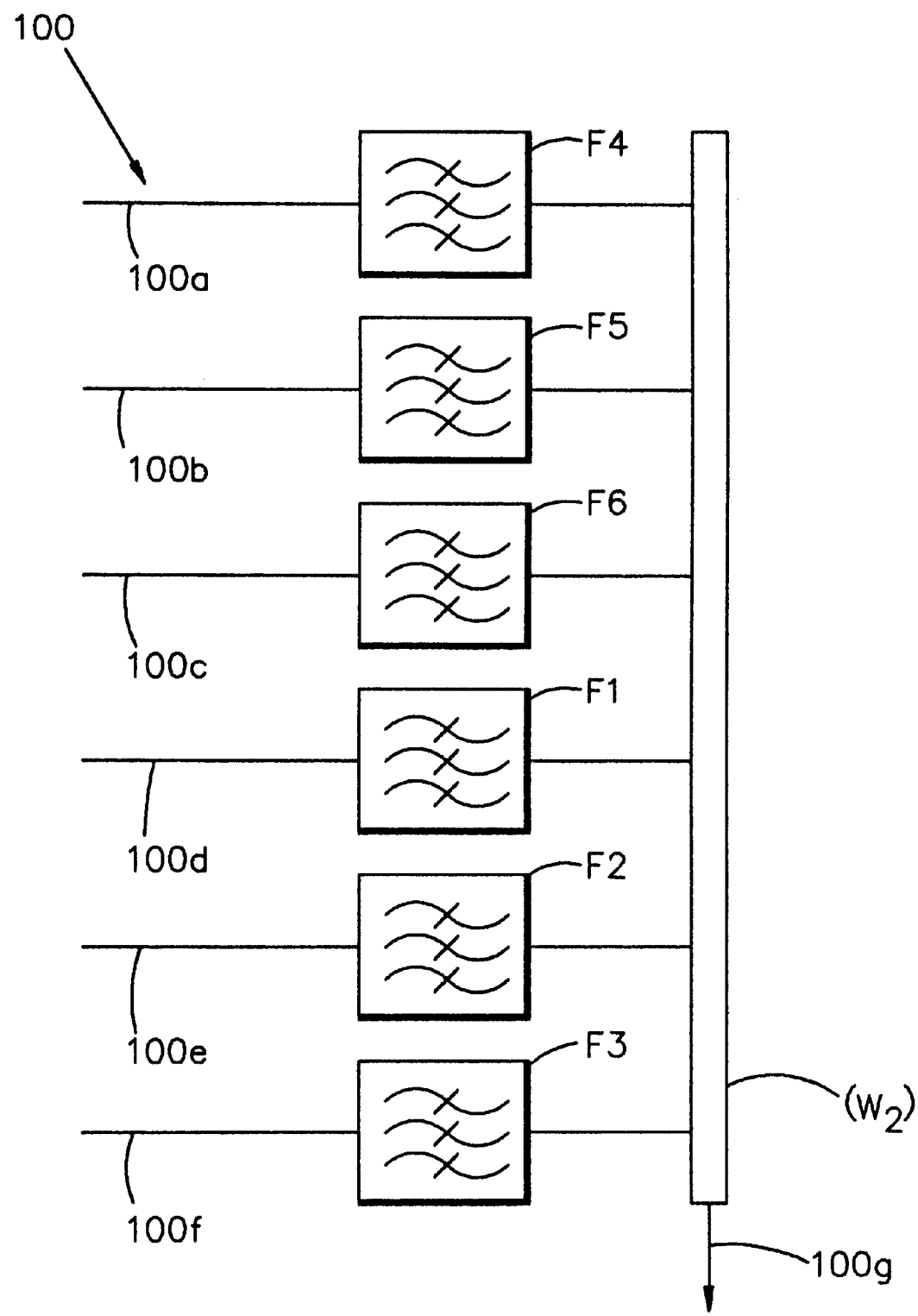
FIG. 6 shows a block diagram of a filter bank of individual output multiplexers (OMUXs) of the CDBS system of FIG. 1b.

In a preferred embodiment of the invention, each OMUX 101a–101h comprises a filter bank that is similar to filter bank 100 shown in FIG. 6. The filter bank 100 preferably includes a waveguide manifold ($W_2$) and six channel filters f1–f6 that are similar to the respective filters f1–f6 of the IMUXs 44–58 described above. According to a preferred embodiment of the invention, the passband frequencies of the filters f1–f3 of the OMUXs 101a–101d are similar to passband frequencies of corresponding ones of the military channels (T2') of the transmit band, as can be understood in view of Table I above. By example, filters f1–f3 of OMUX 101a have passband frequencies that are similar to those of respective channels 1, 5 and 9 of channels (T2') of the transmit band. Also in accordance with the preferred embodiment of the invention, the passband frequencies of filters f4–f6 of the OMUXs 101a–101d are similar to passband frequencies of corresponding ones of the civilian channels (T1') of the transmit band, as also can be understood in view of Table I. By example, filters f4–f6 of OMUX 101a have passband frequencies that are similar to those of respective channels 1, 5 and 9 of channels (T1') of the transmit band.

Also in the preferred embodiment of the invention, the passband frequencies of the filters f1–f3 of the OMUXs 101e–101f are similar to the passband frequencies of corresponding ones of the military channels (T4') of the transmit band, as can be appreciated in view of Table J above. By example, filters f1–f3 of OMUX 101e have passband frequencies that are similar to those of respective channels 1, 5 and 9 of channels (T4') of the transmit band. Further in accordance with the preferred embodiment of the invention, the passband frequencies of the filters f4–f6 of the IMUXs 101e–101h are similar to those of corresponding ones of the civilian channels (T3') of the transmit band, as can also be appreciated in view of Table J. By example, filters f4–f6 of OMUX 101e have passband frequencies that are similar to those of respective channels 1, 5 and 9 of channels (T3') of the transmit band.

Within each OMUX 101a–101h, after signals are received by individual ones of the inputs 100a–100f of the OMUX, the signals are filtered by each of the filters f1–f6, and are then combined by the waveguide manifold ($W_2$). Thereafter, the combined signals are provided to an output 100g, which forms an output of the OMUX. The outputs of each of the OMUXs 101a–101h are supplied to a respective orthomode transducer (OMT) 105 (only two OMTs 105 are shown for clarity). Each OMT 105 preferably left-hand circular polarizes signals that are applied to the OMT 105 (e.g., an RHCP port of the OMT is terminated), although each OMT 105 can instead be employed to perform right-hand circular polarization. After the output signals of the respective OMUXs 101a–101a are polarized in this manner, the polarized signals are then provided to respective ones of the antennas 102A–102H.

The respective antennas 102A–102H then downlink the signals to the pre-selected regions being covered by the antennas 102A–102H. By example, signals that are output by OMUX 101a associated with the amplification section (A) are polarized by OMT 105, and are then downlinked from antenna 102A to the coverage region R3 located on the earth. Within the coverage region R3, the downlinked signals are received by, for example, a terrestrial station 25 (FIG. 5). As can be appreciated, depending upon the frequencies of the signals that were uplinked to the GBS satellite 1 from one or more of the terrestrial stations 21a–21c, 23a–23c, and upon the manner in which the various switches of the CDBS system 10 are controlled to satisfy applicable mission requirements, signals that are downlinked from the GBS satellite 1 to the coverage regions of antennas 102A–102H may have frequencies that are within any of the military and civilian channels of the transmit band. More particularly, in accordance with a preferred embodiment of the invention, each of the antennas 102A–102H can downlink signals over three specific transmit band channels (i.e., there are three transponders per antenna beam). The channels of channel groups (T1') and (T2') (FIG. 2e) over which signals can be downlinked by the respective antennas 102A–102D are shown in the following Table K.

TABLE K

| Antenna | Channels (T2') that can be downlinked by the antenna | Channels (T1') that can be downlinked by the antenna |
| --- | --- | --- |
| 102A | 1, 5, 9 | 1, 5, 9 |
| 102B | 2, 6, 10 | 2, 6, 10 |
| 102C | 3, 7, 11 | 3, 7, 11 |
| 102D | 4, 8, 12 | 4, 8, 12 |

Similarly, the channels of channel groups (T3') and (T4') (FIG. 2g) over which signals can be downlinked by the respective antennas 102E–102H are shown in the following Table L.

TABLE L

| Antenna | Channels (T4') that can be downlinked by the antenna | Channels (T3') that can be downlinked by the antenna |
| --- | --- | --- |
| 102E | 1, 5, 9 | 1, 5, 9 |
| 102F | 2, 6, 10 | 2, 6, 10 |
| 102G | 3, 7, 11 | 3, 7, 11 |
| 102H | 4, 8, 12 | 4, 8, 12 |

In view of the foregoing description, it can be appreciated that the CDBS system 10 of the invention enables the GBS satellite 1 to provide communications service for both military and civilian users simultaneously. More particularly, the CDBS system 10 enables signals that are uplinked to the GBS satellite 1 from a plurality of terrestrial transmitting stations, over any of the civilian or military frequency channels of the receive band, to be simultaneously rebroadcast from the GBS satellite 1 to terrestrial receiving stations located within selected coverage regions on the earth. Thus, the CDBS system 10 enables the GBS satellite 1 to provide service for a greater user community than is serviced by conventional communications spacecraft that do not include the CDBS system 10. Depending upon applicable mission performance requirements, the switches of the CDBS system 10 can be controlled to enable signals to be rebroadcast over all of the channels of only a single one of the military and commercial bands, or over selected channels of each of the military and commercial bands.

As can also be appreciated, since the CDBS system 10 enables service to be provided to both of these user communities via a single communications spacecraft rather than with more than one conventional communications spacecraft, the CDBS system 10 enables communications to be effected between military and/or civilian users in a more efficient and less expensive manner than conventional communications spacecraft. The CDBS system 10 allows commercial spacecraft operators to provide leased services to the government on a pre-emptable basis in particular terrestrial regions, and avoids a need for coordinating commercial bands.

While the invention has been particularly shown and described with respect to preferred embodiments thereof, it will be understood by those skilled in the art that changes in form and details may be made therein without departing from the scope and spirit of the invention.

What is claimed is:

1. A Common Direct Broadcasting Service (CDBS) system for a communications spacecraft, the CDBS system comprising:

N uplink antennas, each of said N uplink antennas for receiving uplinks from terrestrial transmitting stations, each of said uplinks including at least one of left-hand circular polarized (LHCP) signals and right-hand circular polarized (RHCP) signals, individual ones of said LHCP signals and said RHCP signals having frequencies within predetermined channels of at least one of a first predefined frequency band and a second predefined frequency band;

means for separating the LHCP signals of the uplinks received by each of said N uplink antennas from the RHCP signals of the uplinks received by each of said N uplink antennas;

means for converting the separated LHCP signals and RHCP signals of the uplinks received by each of said N uplink antennas to first signals and second signals, respectively, of the uplinks, said first and second signals having frequencies within channels of at least one of a third predefined frequency band and a fourth predefined frequency band;

means for selecting a predetermined number of the first signals and second signals of the uplinks;

means for down-selecting signals of the predetermined number of the first and second signals having frequencies within selected ones of the channels of the at least one of the third and fourth predefined frequency bands;

means for amplifying signals down-selected by said down-selecting means and for outputting resultant amplified signals; and a plurality of downlink antennas for downlinking signals output by said amplifying means from the communications spacecraft to selected ones of the plurality of terrestrial receiving stations.

2. A CDBS system as set forth in claim 1, wherein said first and third predefined frequency bands are allocated for civilian users, and wherein the second and fourth predefined frequency bands are allocated for military users.

3. A CDBS system as set forth in claim 1, wherein said selecting means and said down-selecting means perform in accordance with information supplied to the communications spacecraft from a terrestrial network control station.

4. A method as set forth in claim 1, wherein said amplifying means comprises a plurality of amplification sections, each of said amplification sections including:

a plurality of communications paths, each individual one of said communications paths including at least one traveling wave tube amplifier (TWTA) for amplifying signals applied to said individual communications path and outputting corresponding amplified signals from said individual communications path;

an input redundancy switching ring, said input redundancy switching ring being controllable for applying selected ones of said signals down-linked by said downlinking means to selected ones of said plurality of communications paths; and an output redundancy switching ring, said output redundancy switching ring being controllable for outputting amplified signals output by selected ones of said plurality of communications paths.

5. A CDBS system as set forth in claim 1, wherein each of the first, second, third, and fourth predefined frequency bands includes at least twelve channels.

6. A CDBS system as set forth in claim 1, wherein the first predefined frequency band extends between approximately 29.5 GHz and 30.0 GHz on the frequency spectrum, and wherein the second predefined frequency band extends between approximately 30.0 GHz and 30.5 GHz on the frequency spectrum.

7. A CDBS system as set forth in claim 1, wherein the third predefined frequency band extends between approximately 19.7 GHz and 20.2 GHz on the frequency spectrum, and wherein the fourth predefined frequency band extends between approximately 20.2 GHz and 20.7 GHz on the frequency spectrum.

8. A CDBS system as set forth in claim 1, wherein center frequencies of the channels of individual ones of the first, second, third, and fourth predefined frequency bands are separated by approximately 40 MHz.

9. A CDBS system as set forth in claim 1, wherein the channels of individual ones of the first, second, third, and fourth predefined frequency bands have a bandwidth of about 36 MHz.

10. A method for relaying signals between individual ones of a plurality of terrestrial transmitting stations and selected individual ones of a plurality of terrestrial receiving stations via a communications spacecraft, the method comprising the steps of:

providing uplinks from the plurality of terrestrial stations to said communications spacecraft, each of said uplinks including at least one of left-hand circular polarized (LHCP) signals and right-hand circular polarized (RHCP) signals, individual ones of said LHCP signals and said RHCP signals having frequencies within predetermined channels of at least one of a first predefined frequency band and a second predefined frequency band;

separating the LHCP signals of the uplinks from the RHCP signals of the uplinks;

converting the separated LHCP signals and RHCP signals of the uplinks to first signals and second signals, respectively, of the uplinks, said first and second signals having frequencies within channels of at least one of a third predefined frequency band and a fourth predefined frequency band;

selecting a predetermined number of the first signals and second signals of the uplinks;

down-selecting selected ones of the predetermined number of the first and second signals having frequencies within selected ones of the channels of the at least one of the third and fourth predefined frequency bands; and downlinking down-selected ones of the signals of the predetermined number of first and second signals from the communications spacecraft to selected ones of the plurality of terrestrial receiving stations.

11. A method as set forth in claim 10, wherein the first and third predefined frequency bands are allocated for civilian users, and wherein the second and fourth predefined frequency bands are allocated for military users.

12. A method as set forth in claim 10, wherein the steps of selecting and down-selecting are performed in accordance with information supplied to the communications spacecraft from a terrestrial network control station.

13. A method as set forth in claim 10, wherein, before the step of downlinking is performed, a step is performed of amplifying the down-selected signals.

14. A method as set forth in claim 13, wherein the step of amplifying includes the steps of:

splitting each of the down-selected signals into two corresponding signal portions;

amplifying each of the two corresponding signal portions of each down-selected signal to produce amplified signal portions; and combining the amplified signal portions of each down-selected signal; and wherein the step of downlinking is performed by downlinking combined ones of the amplified signal portions of each down-selected signal from the communications spacecraft to the selected ones of the plurality of terrestrial receiving stations.

15. A method as set forth in claim 10, wherein each of the first, second, third, and fourth predefined frequency bands includes at least twelve channels.

16. A method as set forth in claim 10, wherein the first predefined frequency band extends between approximately 29.5 GHz and 30.0 GHz on the frequency spectrum, and wherein the second predefined frequency band extends between approximately 30.0 GHz and 30.5 GHz on the frequency spectrum.

17. A method as set forth in claim 10, wherein the third predefined frequency band extends between approximately 19.7 GHz and 20.2 GHz on the frequency spectrum, and wherein the fourth predefined frequency band extends between approximately 20.2 GHz and 20.7 GHz on the frequency spectrum.

18. A method as set forth in claim 10, wherein center frequencies of the channels of individual ones of the first, second, third, and fourth predefined frequency bands are separated by approximately 40 MHz.

19. A method as set forth in claim 10, wherein the channels of individual ones of the first, second, third, and fourth predefined frequency bands have a bandwidth of about 36 MHz.

20. A Common Direct Broadcast Service (CDBS) system for a spacecraft, comprising:

N uplink antennas, each of said N uplink antennas for receiving uplinks from terrestrial transmitting stations, each of said uplinks including at least one of left-hand circular polarized (LHCP) signals and right-hand circular polarized (RHCP) signals, individual ones of said LHCP signals and said RHCP signals having frequencies within predetermined channels of at least one of a first predefined frequency band and a second predefined frequency band;

N separating means, individual ones of said N separating means for separating said LHCP signals received by respective ones of said uplink antennas from said RHCP signals received by said respective ones of said uplink antennas, and for outputting separated LHCP and RHCP signals;

a first group of N receivers, individual ones of said first group of N receivers for converting the separated LHCP and RHCP signals output by a first one of said N separating means to first converted signals having frequencies within channels of at least one of a third and a fourth predefined frequency band;

a second group of N receivers, individual ones of said second group of N receivers for converting the separated LHCP and RHCP signals output by a second one of said N separating means to second converted signals having frequencies within channels of at least one of said third and fourth predefined frequency bands;

means for splitting said first converted signals into 2N corresponding first converted signals, and for splitting each of said second converted signals into 2N corresponding second converted signals;

a plurality of switching means, individual ones of said plurality of switching means being controllable for selecting one of said 2N corresponding first converted signals and said 2N corresponding second converted signals, and for providing the selected one of said 2N corresponding first converted signals and said 2N corresponding second converted signals to a respective output;

a plurality of downlink antennas, each of said downlink antennas for downlinking signals applied thereto to a respective pre-selected terrestrial region; and means, being controllable, for selecting at least one of said signals output by individual ones of said plurality of switching means, and for providing an output to selected ones of said plurality of downlink antennas.

21. A Common Direct Broadcasting Service (CDBS) system for a communications spacecraft, the CDBS system comprising:

a plurality of uplink antennas, each of said uplink antennas for receiving uplinks from terrestrial transmitting stations, each of said uplinks including at least one of left-hand circular polarized (LHCP) signals and right-hand circular polarized (RHCP) signals, said LHCP signals and said RHCP signals having frequencies within predetermined ones of N channels of a first predefined frequency band and N channels of a second predefined frequency band;

means for converting the LHCP signals and the RHCP signals of said uplinks received by each of said uplink antennas to first signals and second signals, respectively, of the uplinks, said first and second signals having frequencies within predetermined ones of N channels of a third predefined frequency band and N channels of a fourth predefined frequency band;

means for selecting N of the first signals and the second signals;

means for down-selecting N/2 of the N first and second signals selected by said selecting means having frequencies within selected ones of the channels of the third and fourth predefined frequency bands;

plurality of downlink antennas for downlinking signals down-selected by said down-selecting means from the communications spacecraft to selected ones of the plurality of terrestrial receiving stations.

22. A CDBS system as set forth in claim 21, wherein said first and third predefined frequency bands are allocated for civilian users, and wherein the second and fourth predefined frequency bands are allocated for military users.

* * * * *